US012514646B2

(12) United States Patent
Bahour et al.

(10) Patent No.: US 12,514,646 B2
(45) Date of Patent: Jan. 6, 2026

(54) SYSTEM AND METHOD FOR AUGMENTED REALITY SURGICAL ASSISTANCE WITH INTEGRATED BIOMECHANICAL METRICS

(71) Applicant: Provision Surgical Inc., Dover, DE (US)

(72) Inventors: Abdullah Adnan Bahour, Nashville, TN (US); Vincent Michael Clayton, Nashville, TN (US); Kevin Woo Park, Great Falls, VA (US); En-Hua Wang, Centreville, VA (US)

(73) Assignee: Provision Surgical Inc., Dover, DE (US)

( * ) Notice: Subject to any disclaimer, the term of this patent is extended or adjusted under 35 U.S.C. 154(b) by 0 days.

(21) Appl. No.: 19/169,236

(22) Filed: Apr. 3, 2025

(65) Prior Publication Data

US 2025/0312100 A1 Oct. 9, 2025

Related U.S. Application Data

(60) Provisional application No. 63/654,922, filed on May 31, 2024, provisional application No. 63/654,917, (Continued)

(51) Int. Cl.
*A61B 34/10* (2016.01)
*A61B 90/00* (2016.01)

(52) U.S. Cl.
CPC ............ *A61B 34/10* (2016.02); *A61B 90/361* (2016.02); *A61B 2034/105* (2016.02)

(58) Field of Classification Search
CPC . A61B 34/10; A61B 90/361; A61B 2034/105; A61B 2034/102; A61B 2090/365; A61B 2090/372
See application file for complete search history.

(56) References Cited

U.S. PATENT DOCUMENTS 9,123,155 B2 9/2015 Cunningham et al.
9,547,940 B1 1/2017 Sun et al.
(Continued)

FOREIGN PATENT DOCUMENTS

BR 112022017198 A2 11/2022
CN 103445863 A 12/2013
(Continued)

*Primary Examiner* — Maurice L. Mcdowell, Jr.

(74) *Attorney, Agent, or Firm* — GIBRALTAR CONSULTING LLC; Tariq Najee-Ullah

(57) ABSTRACT

A system for augmented reality surgical assistance may include an augmented reality surgical interface configured to be worn by a user, a bone and implant rendering module configured to generate three-dimensional models based on patient imaging data, a biomechanical metrics module configured to calculate biomechanical and alignment metrics, and a processor configured to integrate the three-dimensional models and biomechanical metrics for display via the augmented reality surgical interface. The system may further include an interactive manipulation interface configured to enable manipulation of the three-dimensional models and biomechanical metrics through user input such as hand gestures or external tool movements. The biomechanical metrics may include various angles and measurements related to bone alignment and implant positioning. The processor may be configured to update the integrated models and metrics based on surgical progress. Methods and computer-readable media for providing such augmented reality surgical assistance are also disclosed.

17 Claims, 29 Drawing Sheets

Related U.S. Application Data filed on May 31, 2024, provisional application No. 63/573,503, filed on Apr. 3, 2024.

(56) References Cited

U.S. PATENT DOCUMENTS

| | | | |
|---|---|---|---|
| 10,258,426 B2 | 4/2019 | Silva et al. | |
| 10,898,151 B2 | 1/2021 | Harding et al. | |
| 11,307,653 B1* | 4/2022 | Qian | G06F 3/012 |
| 12,186,022 B2 | 1/2025 | Luo et al. | |
| 2006/0161052 A1* | 7/2006 | Colombet | A61B 34/10 |
| | | | 600/300 |
| 2009/0043556 A1* | 2/2009 | Axelson | A61B 90/36 |
| | | | 600/416 |
| 2015/0138065 A1* | 5/2015 | Alfieri | G02B 27/017 |
| | | | 345/156 |
| 2018/0256258 A1* | 9/2018 | Nash | G06T 19/006 |
| 2018/0338814 A1 | 11/2018 | Saget et al. | |
| 2020/0143594 A1 | 5/2020 | Lal et al. | |
| 2021/0045838 A1 | 2/2021 | Bradbury et al. | |
| 2021/0174956 A1 | 6/2021 | McGinley et al. | |
| 2021/0290319 A1* | 9/2021 | Poltaretskyi | G02B 27/017 |
| 2021/0354023 A1* | 11/2021 | Sinclair | A63B 24/0006 |
| 2022/0159227 A1* | 5/2022 | Quiles Casas | A61B 34/10 |
| 2022/0183760 A1* | 6/2022 | Fouts | A61B 90/37 |
| 2022/0241036 A1* | 8/2022 | Elbanna | A61B 34/25 |
| 2022/0257332 A1 | 8/2022 | Duong | |
| 2022/0287676 A1* | 9/2022 | Steines | A61B 90/37 |
| 2022/0331053 A1 | 10/2022 | Kimball et al. | |
| 2023/0018541 A1 | 1/2023 | Tanzer et al. | |
| 2023/0114385 A1 | 4/2023 | Ahmed et al. | |
| 2023/0372050 A1 | 11/2023 | Blondel et al. | |
| 2023/0377714 A1* | 11/2023 | Liarno | G16H 20/40 |
| 2024/0212292 A1* | 6/2024 | Spooner | A61B 5/4538 |
| 2025/0009431 A1* | 1/2025 | Roakes | A61G 13/125 |
| 2025/0120771 A1* | 4/2025 | Adams | A61B 34/20 |

FOREIGN PATENT DOCUMENTS

| | | |
|---|---|---|
| CN | 104274247 A | 1/2015 |
| CN | 107016685 A | 8/2017 |
| CN | 108882854 A | 11/2018 |
| CN | 109035414 A | 12/2018 |
| CN | 109106448 A | 1/2019 |
| CN | 111053598 A | 4/2020 |
| CN | 113473937 A | 10/2021 |
| CN | 114711962 A | 7/2022 |
| CN | 116795213 A | 9/2023 |
| CN | 117174249 A | 12/2023 |
| CN | 117480563 A | 1/2024 |
| EP | 3533409 B1 | 9/2019 |
| EP | 3920823 A1 | 12/2021 |
| JP | 2023548773 A | 11/2023 |
| KR | 20150024029 A | 3/2015 |
| KR | 102085374 B1 | 3/2020 |
| KR | 20210071567 A | 6/2021 |
| KR | 20230083279 A | 6/2023 |
| RU | 2707369 C1 | 11/2019 |
| WO | 2020163316 A1 | 8/2020 |
| WO | 2020163318 A1 | 8/2020 |
| WO | 2021062375 A1 | 4/2021 |
| WO | 2021112312 A1 | 6/2021 |
| WO | 2021174172 A1 | 9/2021 |
| WO | 2022219489 A1 | 10/2022 |
| WO | 2022219492 A1 | 10/2022 |
| WO | 2023086332 A1 | 5/2023 |
| WO | 2023086592 A2 | 5/2023 |

* cited by examiner

NON-TRANSITORY
COMPUTER-READABLE
MEDIUM
STORINGINSTRRUCTIONS
*non-transitory*
*computer-readable medium*
*storing instructions*
2600

*FIG. 26* non-transitory
computer-readable medium
storing instructions
2600 biomechanical metrics 2314

| hip-knee-ankle angle 2316 | lateral distal Femoral angle 2318 | medial proximal tibial angle 2320 | tibiofemoral joint line angle 2322 | knee ankle angle 2324 |
| --- | --- | --- | --- | --- |
| joint line-convergence angle 2326 | femur valgus 2328 | tibia varus/valgus 2330 | flexion/extension 2332 | tibial slope 2334 |

*FIG. 27*

SYSTEM AND METHOD FOR AUGMENTED REALITY SURGICAL ASSISTANCE WITH INTEGRATED BIOMECHANICAL METRICS

CROSS-REFERENCE TO RELATED APPLICATIONS

This application claims the benefit of U.S. Provisional Application No. 63/654,922, filed May 31, 2024, entitled "TRANSLATING MEDICAL IMAGING DATA FOR USE IN AUGMENTED REALITY DEVICES FOR SURGICAL ENHANCEMENT"; U.S. Provisional Application No. 63/654,917, filed May 31, 2024, entitled "PRECISE BONE AND IMPLANT RENDERING FOR AUGMENTED REALITY SURGICAL ASSISTANCE"; and U.S. Provisional Application No. 63/573,503, filed Apr. 3, 2024, entitled "SYSTEM FOR INTEGRATING MEANINGFUL BIOMECHANICAL AND ALIGNMENT METRICS IN AUGMENTED REALITY SURGICAL ASSISTANCE". The entire contents of each of the above applications are hereby incorporated by reference herein.

FIELD OF THE INVENTION

The present disclosure relates generally to surgical assistance systems and methods. More particularly, the disclosure relates to systems and methods for augmented reality surgical assistance that integrate precise bone and implant rendering with meaningful biomechanical and alignment metrics.

BACKGROUND

Traditional surgical methods for implant placement and bone reconstruction often rely on two-dimensional imaging and manual measurements. These approaches can lead to inaccuracies in implant positioning, increased surgery time, and extended recovery periods for patients. Additionally, conventional methods for assessing and correcting biomechanical alignment in orthopedic surgery may fail to provide real-time, comprehensive visual feedback on critical biomechanical parameters.

There is a significant need for technological solutions that can provide precise, real-time visual guidance for implant positioning and bone reconstruction, as well as integrate meaningful biomechanical and alignment metrics. Such solutions could potentially enhance surgical accuracy, reduce complications, and improve patient outcomes across various surgical specialties.

SUMMARY

The present disclosure provides systems and methods for augmented reality surgical assistance that integrate precise bone and implant rendering with meaningful biomechanical and alignment metrics. In some embodiments, the systems and methods may translate medical imaging data into interactive three-dimensional models for use in augmented reality devices.

In one aspect, a system for augmented reality surgical assistance is provided. The system may comprise: an augmented reality surgical interface configured to be worn by a user; a bone and implant rendering module configured to generate three-dimensional models based on patient imaging data; a biomechanical metrics module configured to calculate biomechanical and alignment metrics; and a processor configured to integrate the three-dimensional models and biomechanical metrics for display via the augmented reality surgical interface.

In another aspect, a method for providing augmented reality surgical assistance is provided. The method may comprise: receiving patient imaging data; generating three-dimensional models of bone structures and implants based on the patient imaging data; calculating biomechanical and alignment metrics based on the patient imaging data and three-dimensional models; integrating the three-dimensional models and biomechanical metrics; and displaying the integrated models and metrics via an augmented reality surgical interface.

In a further aspect, a non-transitory computer-readable medium storing instructions is provided. The instructions, when executed by a processor, may cause the processor to perform operations comprising: receiving patient imaging data; generating three-dimensional models of bone structures and implants based on the patient imaging data; calculating biomechanical and alignment metrics based on the patient imaging data and three-dimensional models; integrating the three-dimensional models and biomechanical metrics; and transmitting the integrated models and metrics for display via an augmented reality surgical interface.

The foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate exemplary embodiments of the disclosure and, together with the description, serve to explain the principles of the disclosure.

FIG. 26 is a block diagram illustrating a non-transitory computer-readable medium storing instructions, according to some embodiments of the present disclosure.

FIG. 27 is a block diagram further illustrating the non-transitory computer-readable medium storing instructions from FIG. 26, according to some embodiments of the present disclosure.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts. The present disclosure provides systems and methods for augmented reality surgical assistance that integrate precise bone and implant rendering with meaningful biomechanical and alignment metrics. The systems and methods described herein may be used in various surgical specialties, including but not limited to orthopedic surgery, spinal surgery, maxillofacial surgery, trauma surgery, and dental implant procedures.

It should be understood that the systems and methods described herein are provided as examples only and may be implemented in many different ways. Various omissions, substitutions, and changes in the form and details of the systems and methods described herein may be made without departing from the spirit of the disclosure. The accompanying claims and their equivalents are intended to cover such forms or modifications as would fall within the scope and spirit of the disclosure.

The workflow for surgeon interactions within the Provision Surgical system is implemented in four stages. First, during patient image acquisition and processing, the surgeon uploads CT scans or retrieves imaging data from PACS. AI then processes these images to generate a 3D patient-specific anatomical model for review, allowing the surgeon to assess segmentation accuracy and make modifications if necessary. In the preoperative review and surgical planning stage, the surgeon interacts with the 3D model using either a desktop or a head-mounted display (HMD). Key interactions include rotating, zooming, and slicing through multiplanar 3D views, defining implant size, placement, and alignment, and setting landmarks and measurements for surgical guidance. During intraoperative execution and adjustments, the surgeon wears an AR headset to visualize the preoperative plan overlaid onto the real patient anatomy. Real-time AR projections guide the procedure, enabling adjustments to implant positioning based on intraoperative conditions, hand-tracking or voice commands for interacting with the holographic model, and a comparison of planned versus actual instrument positioning during surgery. Finally, in the postoperative review and analytics stage, the surgeon saves final procedural data for documentation and analysis. The system then compares actual implant placement with preoperative goals, providing AI-driven insights on accuracy, deviations, and long-term predictions. Surgeons can review case outcomes and refine future surgical plans based on AI recommendations.

Figure 1:
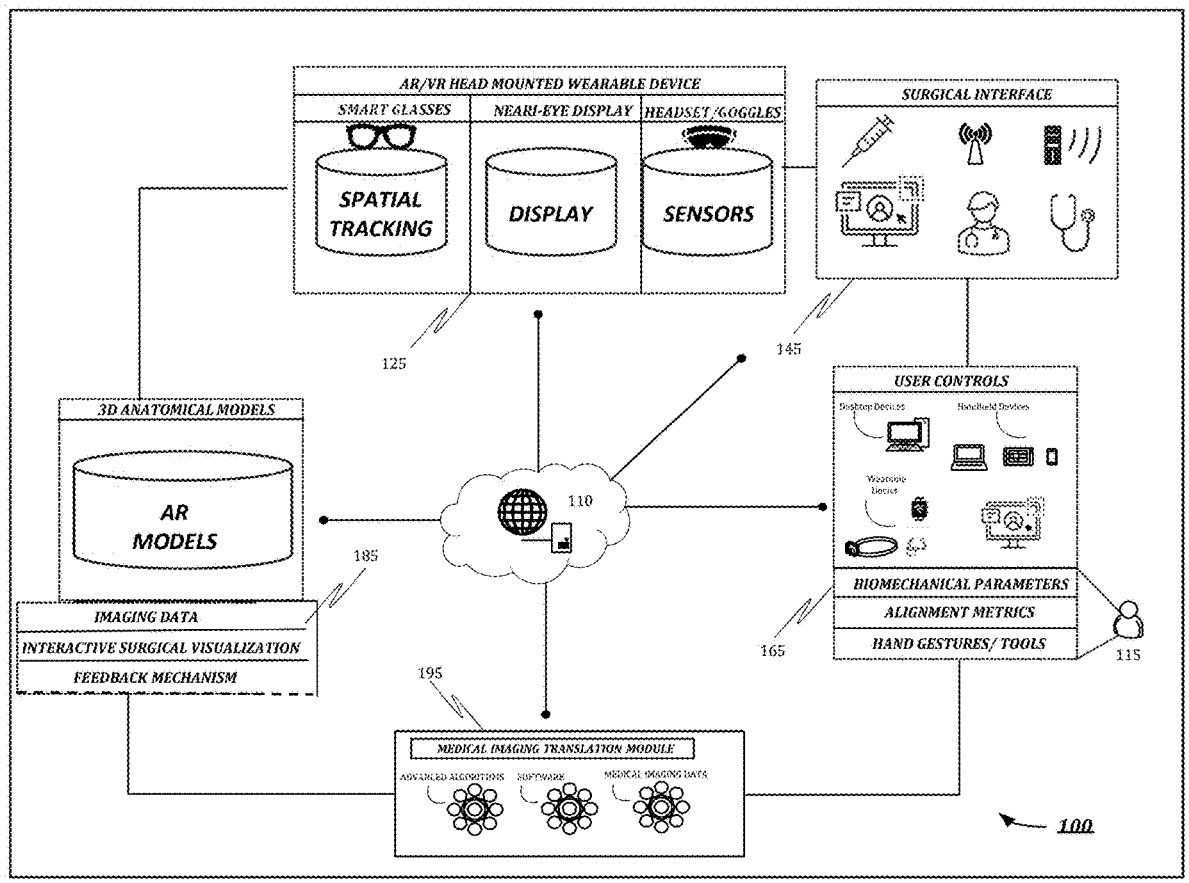
FIG. 1 is a schematic diagram illustrating a system architecture for the AR surgical assistance system, in accordance with embodiments of the present disclosure.

FIG. 1 illustrates an example system architecture 100 for the AR surgical assistance system an augmented reality (AR) and/or a virtual reality (VR) surgical visualization and guidance system, which integrates various modules and devices to enhance user control and interaction during medical procedures. The system comprises several interconnected components configured to provide real-time visualization, guidance, and feedback. An AR/VR head-mounted wearable device 125 serves as a primary interface for the user. This device can include smart glasses, a near-eye display, or a headset/goggles, configured to facilitate immersive visualization and interaction. The wearable device is equipped with spatial tracking, a display module, and sensors. The spatial tracking module monitors the position and orientation of the device to ensure accurate visualization within a surgical environment. The display module projects visual information, including three-dimensional anatomical models and interactive graphics. The sensors capture environmental data and track user movements, enabling precise alignment and interaction within the AR/VR environment.

The system further includes a 3D anatomical models module 185, which implements AR models representing anatomical structures in three dimensions. This module also stores imaging data acquired from medical imaging devices, enabling the system to render realistic and detailed anatomical visualizations. The interactive surgical visualization component processes and displays the anatomical data, providing a dynamic representation of the patient's anatomy during surgical procedures. A feedback mechanism is also incorporated to facilitate adaptive responses to user inputs, enhancing the precision of surgical guidance.

A surgical interface 145 is integrated into the system to connect with surgical instruments and other relevant devices. This interface includes various sensors and interface elements to collect data from the surgical environment. Additionally, wireless connectivity facilitates data transfer between the wearable device and the surgical tools, ensuring that the system remains responsive and interactive throughout the procedure. The system also features a user control module 165 that supports various input devices, including desktop devices, handheld devices, and wearable devices. These devices enable the user to interact with the system through different modalities, promoting flexibility in control and operation. The user control module tracks biomechanical parameters to monitor user movements and positioning. Additionally, it assesses alignment metrics to verify the accuracy of tool and device placement during surgery. Hand gestures and tool usage are detected and processed through a dedicated input mechanism 115, allowing the user to manipulate visualizations and control the system hands-free. A medical imaging translation module 195 is included to process and interpret medical imaging data. This module incorporates advanced algorithms that analyze imaging data and convert it into formats suitable for AR/VR visualization. The software within the module integrates these algorithms with the user interface, allowing display of medical imaging data, which aids in preoperative planning and intraoperative guidance.

In an embodiment, the system may implement a central processing and network hub 110, which facilitates data flow between the AR/VR devices, user controls, surgical interfaces, and the medical imaging translation module. This hub acts as a conduit for real-time data processing, ensuring that all system components remain synchronized and responsive. Through this centralized architecture, the system supports real-time feedback, interactive visualization, and precise guidance, enhancing the accuracy and efficacy of surgical procedures.

Figure 2A:
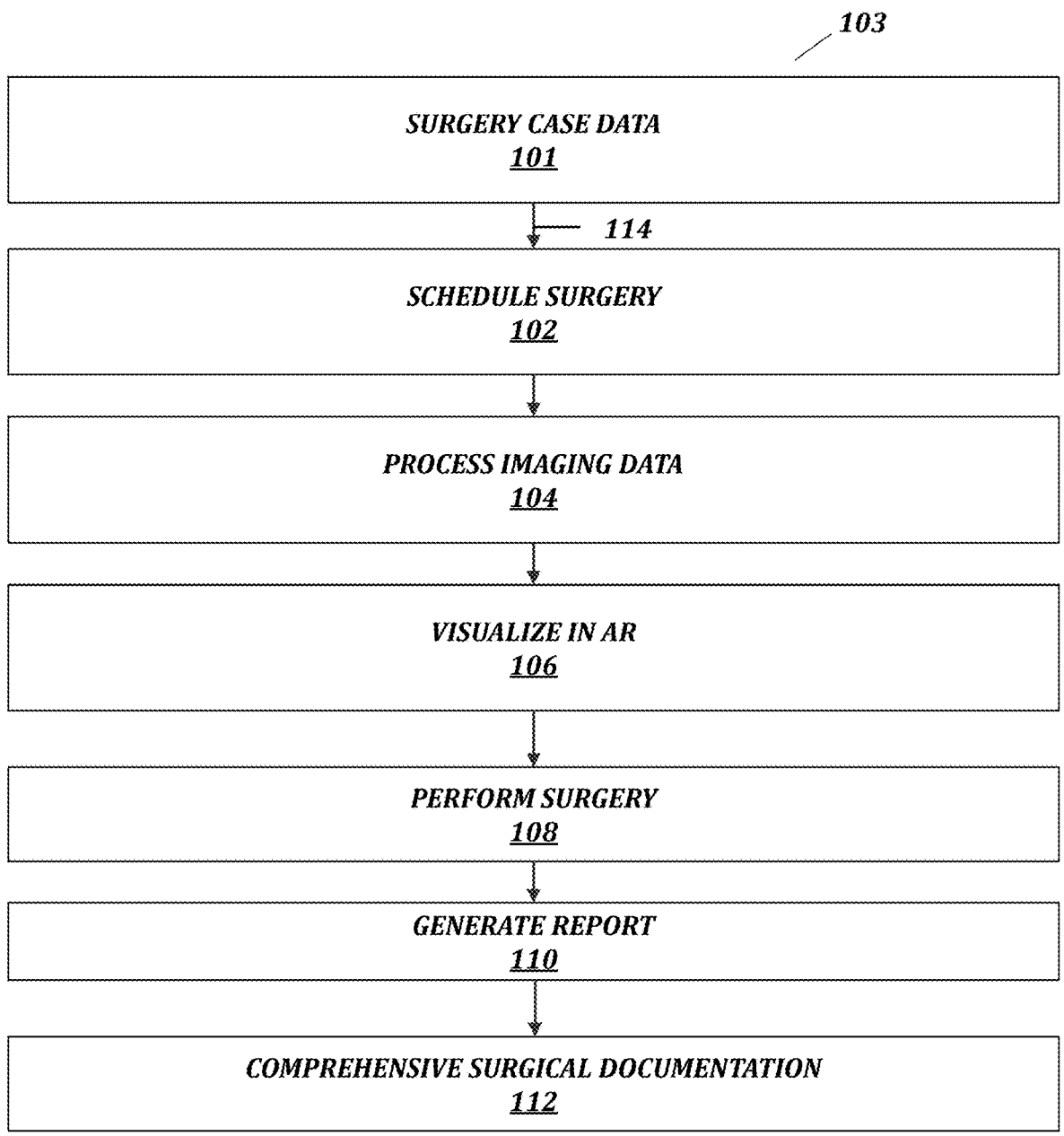
FIG. 2A is a schematic diagram illustrating a Bone Alignment and Resection Planning Flow, in accordance with embodiments of the present disclosure.

FIG. 2A is a schematic diagram illustrating a Bone Alignment and Resection Planning Flow 103, which illustrates a layered data processing workflow for a surgical case, where surgery case data 101 is processed through multiple stages to generate comprehensive surgical documentation 112. The process begins with scheduling the surgery 102, ensuring that all necessary procedural details are logged. Next, patient imaging data 104, such as CT or MRI scans, is processed to generate 3D anatomical models. Once processed, the data is visualized in AR 106 for preoperative planning and intraoperative guidance. The surgery is then performed 108 using AR-based guidance, real-time tracking, and visualization tools to assist with accuracy and alignment. Following the procedure, a detailed report is generated 110, documenting implant placement, alignment accuracy, and any deviations from the plan. Each stage refines the surgical case data, ensuring seamless integration and workflow continuity, with element 114 likely representing the structural connection between these stages. This diagram effectively conveys the systematic approach of incorporating AR technology into surgical planning and execution.

The bone alignment and resection planning flow begins with case scheduling and data upload, where the surgery is scheduled, imaging data is uploaded, and surgeon preferences are selected through a secure web portal. Next, automated processing takes place on a cloud server, which analyzes the imaging data, generates 3D anatomical models, and creates a surgical plan with alignment targets. Once processed, the Unity app loads patient-specific models and alignment plans for AR visualization. During the procedure, intraoperative guidance is provided through an AR headset, which displays alignment guides and delivers real-time visual feedback on resection accuracy. Following surgery, postoperative documentation is automatically generated, including detailed reports on resection angles, alignment deviations, and surgical adjustments for review and compliance purposes.

Figure 2B:
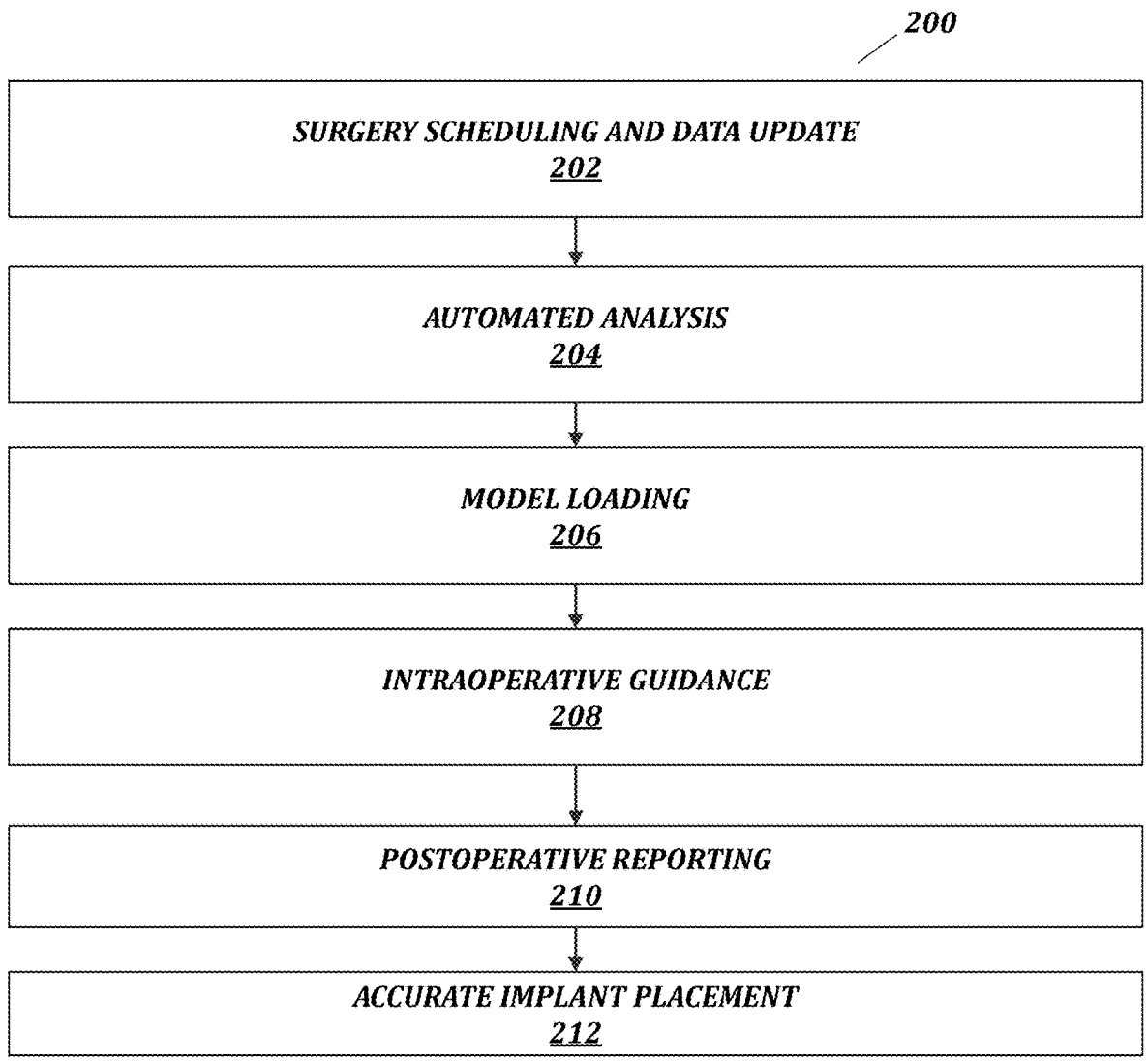
FIG. 2B is a schematic diagram illustrating an Implant Sizing, Fit, and Positioning Flow, in accordance with embodiments of the present disclosure.

FIG. 2B is a schematic diagram illustrating an Implant Sizing, Fit, and Positioning Flow 200, in accordance with embodiments of the present disclosure. The implant sizing, fit, and positioning flow begins with case scheduling and data upload 202, where the surgery is scheduled, imaging data is uploaded, and implant preferences are selected through a secure web portal. Following this, automated processing occurs on a cloud server, which implements automated analysis 204 which analyzes bone geometry, determines the optimal implant size, and generates a surgical plan. The Unity app then dynamically loads, via model loading 206, patient-specific implant models and alignment markers for AR visualization. During the procedure, intraoperative guidance 208 is provided through an AR headset, which tracks instrument placement, monitors alignment and spacing, and delivers real-time feedback to the surgical team. After the surgery, postoperative reporting 210 and documentation is automatically generated, including reports detailing accurate implant placement 212, implant size, positioning accuracy, and any deviations from the planned procedure.

Figure 3:
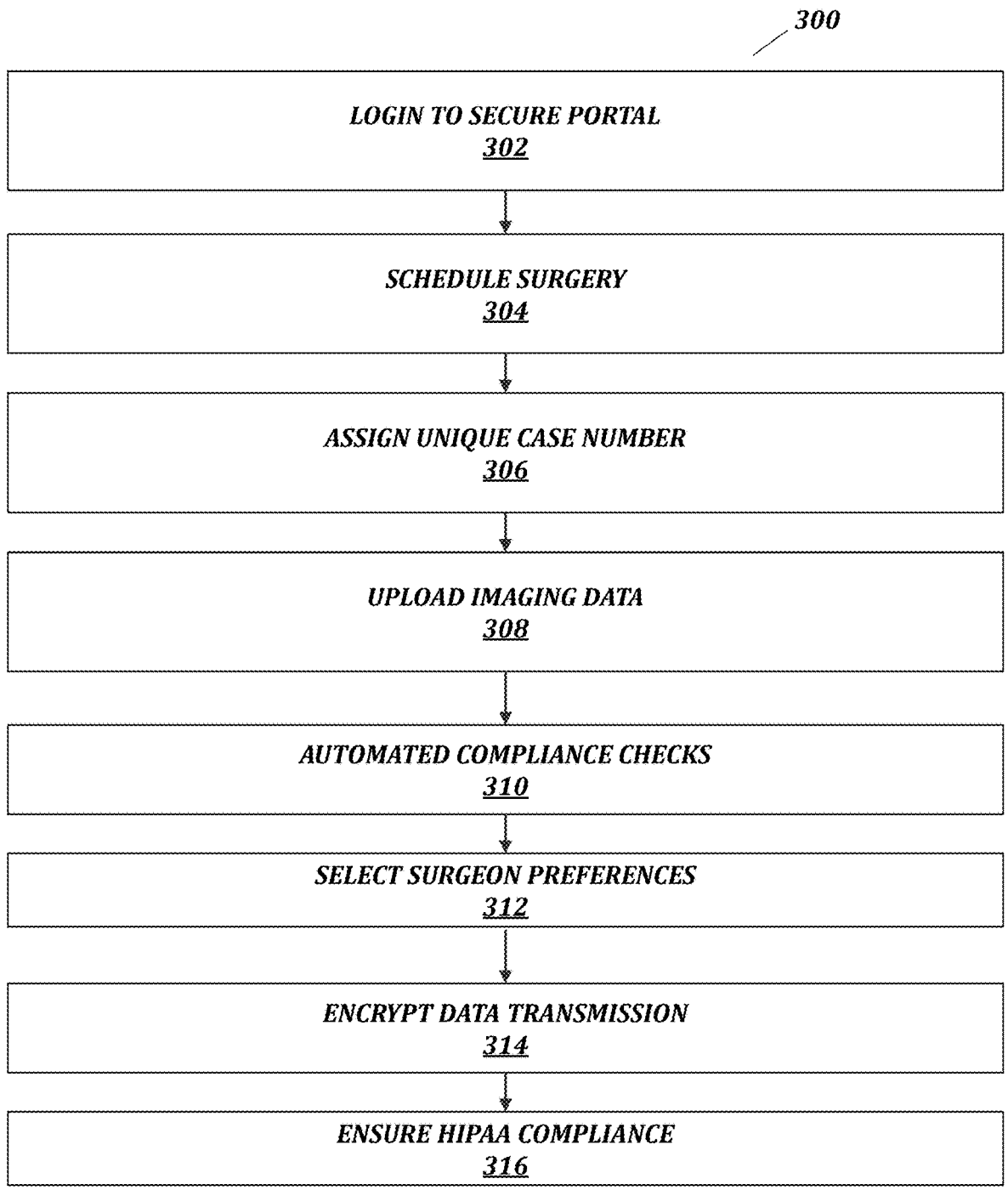
FIG. 3 is a schematic diagram illustrating a Surgical Case Scheduling and Data Management Flow, in accordance with embodiments of the present disclosure.

FIG. 3 is a schematic diagram illustrating a Surgical Case Scheduling and Data Management Flow 300, in accordance with embodiments of the present disclosure. The bone alignment and resection planning flow begins with case scheduling and data upload, involving the surgeon, surgical coordinator, and IT staff. The process starts when the surgeon or coordinator logs into a secure web portal 302 using multi-factor authentication. Once logged in, the surgery is scheduled 304, and a unique case number 306 is assigned. Imaging data, including CT or MRI DICOM files, is then uploaded 308, undergoing automated compliance checks 310 to ensure proper format and quality. The surgeon selects preferences 312 such as alignment approach, default resection angles, and alternative scenarios tailored to the procedure. All data is securely transmitted to the cloud server using AES-256 encryption 314, ensuring compliance with HIPAA regulations 316.

Figure 4:
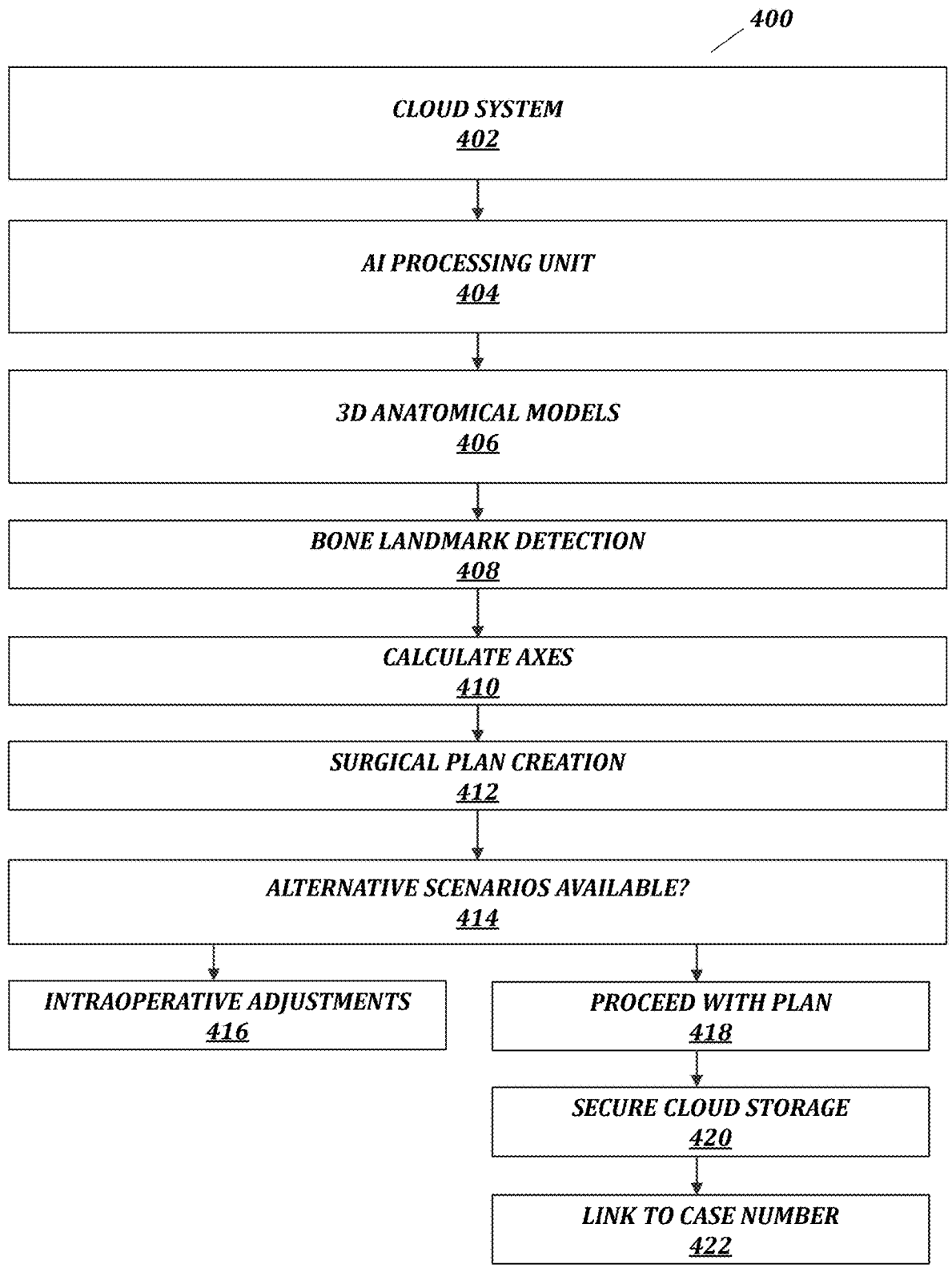
FIG. 4 is a schematic diagram illustrating an Automated Processing & Surgical Planning Flow, in accordance with embodiments of the present disclosure.

FIG. 4 is a schematic diagram illustrating an Automated Processing & Surgical Planning Flow 400, in accordance with embodiments of the present disclosure. The automated processing and surgical planning phase involves one or more stakeholders, including the cloud system 402, AI processing unit 404, and case engineer. The process begins with AI and machine learning algorithms analyzing the imaging data to generate 3D anatomical models 406 in FBX or OBJ formats, ensuring compatibility with Unity. These models undergo further bone landmark detection 408 analysis to calculate the mechanical and anatomical axes 410. A surgical plan is then created 412, detailing optimal resection angles, bone cuts, and alignment targets. Additionally, multiple alternative scenarios 414 are preloaded to allow for intraoperative adjustments 416. All processed data is securely stored in the cloud 420 using services such as AWS S3, Azure Blob, or Google Cloud, with each case linked 422 to a unique case number for streamlined access, as the plan proceeds 418.

Figure 5:
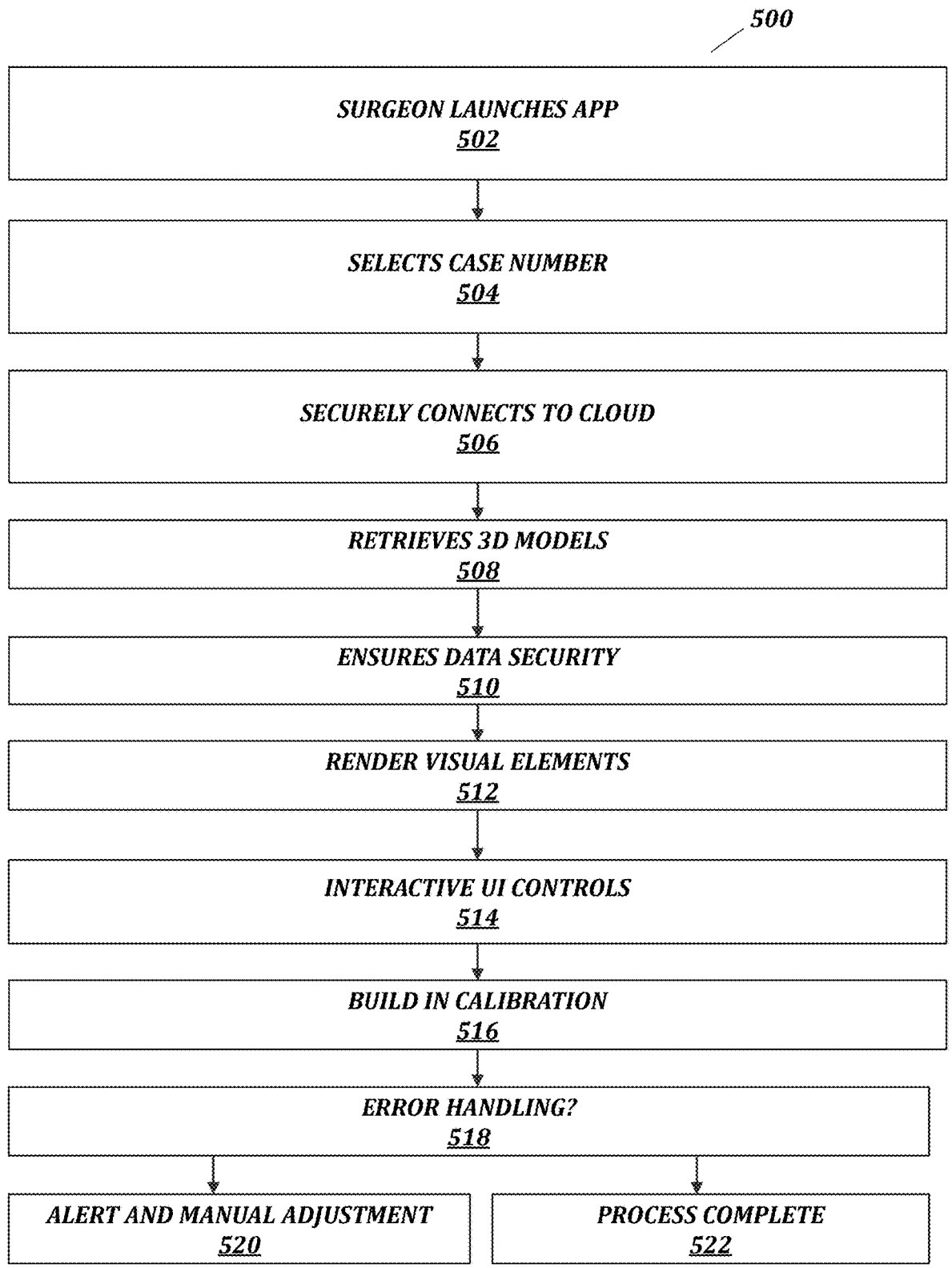
FIG. 5 is a schematic diagram illustrating a Loading Process in Unity App for Surgery Flow, in accordance with embodiments of the present disclosure.

FIG. 5 is a schematic diagram illustrating a Loading Process in Unity App for Surgery Flow 500, in accordance with embodiments of the present disclosure. The loading process in the Unity app involves one or more stakeholders, including the surgeon and the surgical team. In the operating room, the surgeon launches the Pair Guide application 502 using AR glasses and securely connects to the cloud 506. The system connects securely to the cloud, allowing the surgeon to select the assigned case number 504 and retrieve patient-specific 3D anatomical models 508 and surgical plans. The app dynamically loads these models in formats such as FBX and OBJ, optimized for real-time AR rendering. Data transmission follows encrypted communication protocols to ensure data security 510 and compliance with HIPAA and FDA regulations.

The visualization process includes adjustable transparency, scaling, and positioning of anatomical models to render one or more visual elements 512 and/or to provide an unobstructed surgical view. Interactive UI controls 514 and/or elements enable surgeons to toggle between visualization layers, alignment markers, and alternative scenarios using voice commands, hand gestures, or touch controls. A built-in calibration system 516 ensures that 3D models align accurately with real-world anatomical landmarks. Additionally, error-handling mechanisms 518 detect and alert 520 users to data load failures, calibration issues, or incomplete models, offering manual adjustment options when necessary. After being processed by the error-handling mechanism 518, the process is complete 522.

Figure 6:
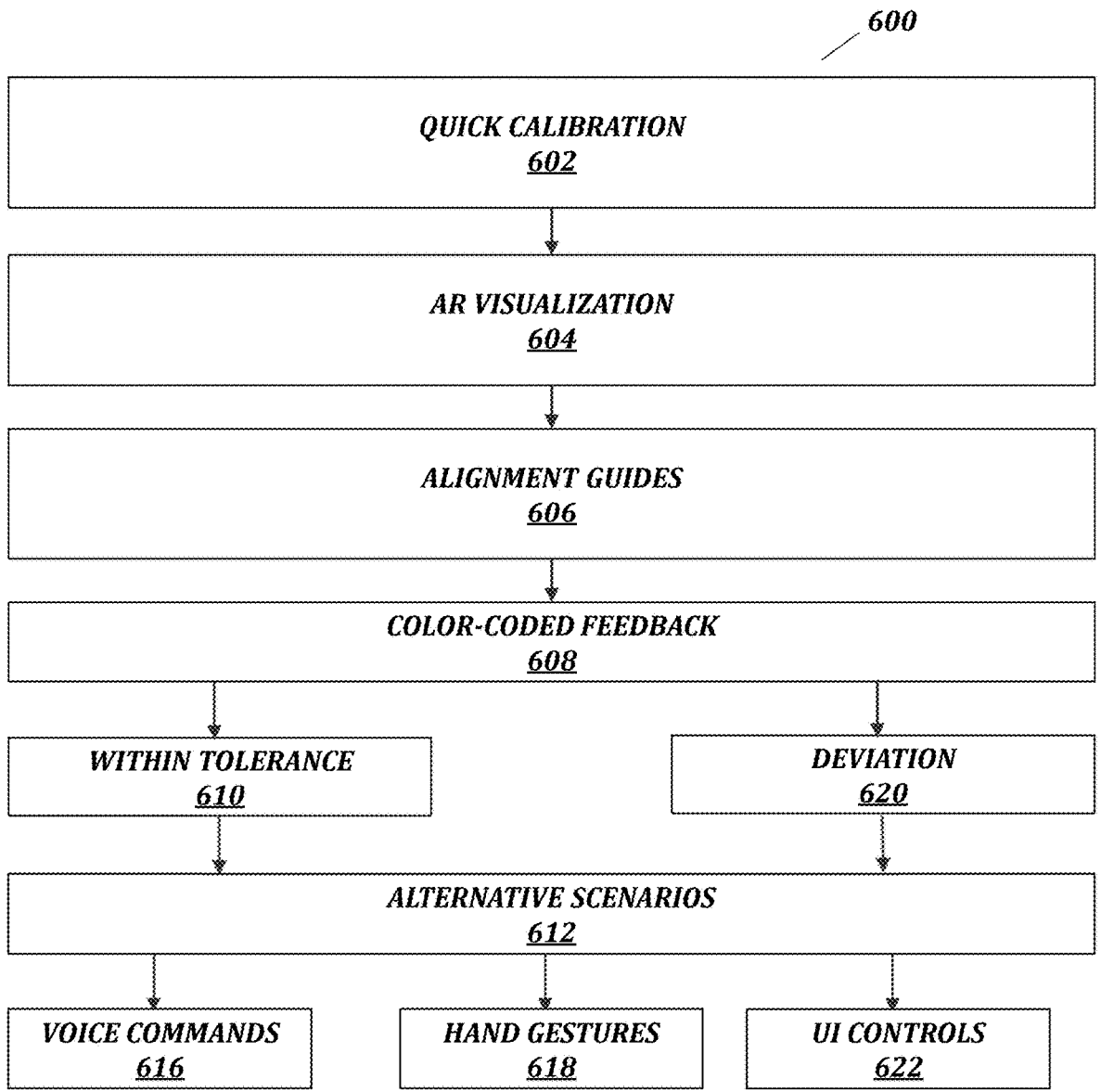
FIG. 6 is a schematic diagram illustrating an Intraoperative AR Guidance Process Flow, in accordance with embodiments of the present disclosure.

FIG. 6 is a schematic diagram illustrating an Intraoperative AR Guidance Process Flow 600, in accordance with embodiments of the present disclosure. During the intraoperative guidance process, key stakeholders, including the surgeon and the surgical team, utilize AR to enhance precision during surgery. The process begins with a quick calibration 602 to ensure that the AR headset accurately aligns with the patient's anatomy. Once calibrated, the AR visualization 604 overlays the 3D anatomical model onto the surgical site, providing real-time reference points for the procedure. Alignment guides 606 display visual indicators for resection accuracy, with color-coded feedback 608. For example, the color green indicates alignment within tolerance 610 and the color red signals deviation 620 from a predetermined threshold. Surgeons can toggle between alternative surgical scenarios 612 using voice commands 616, hand gestures 618, and/or interactive UI controls 622, allowing for dynamic adjustments based on intraoperative conditions.

Figure 7:
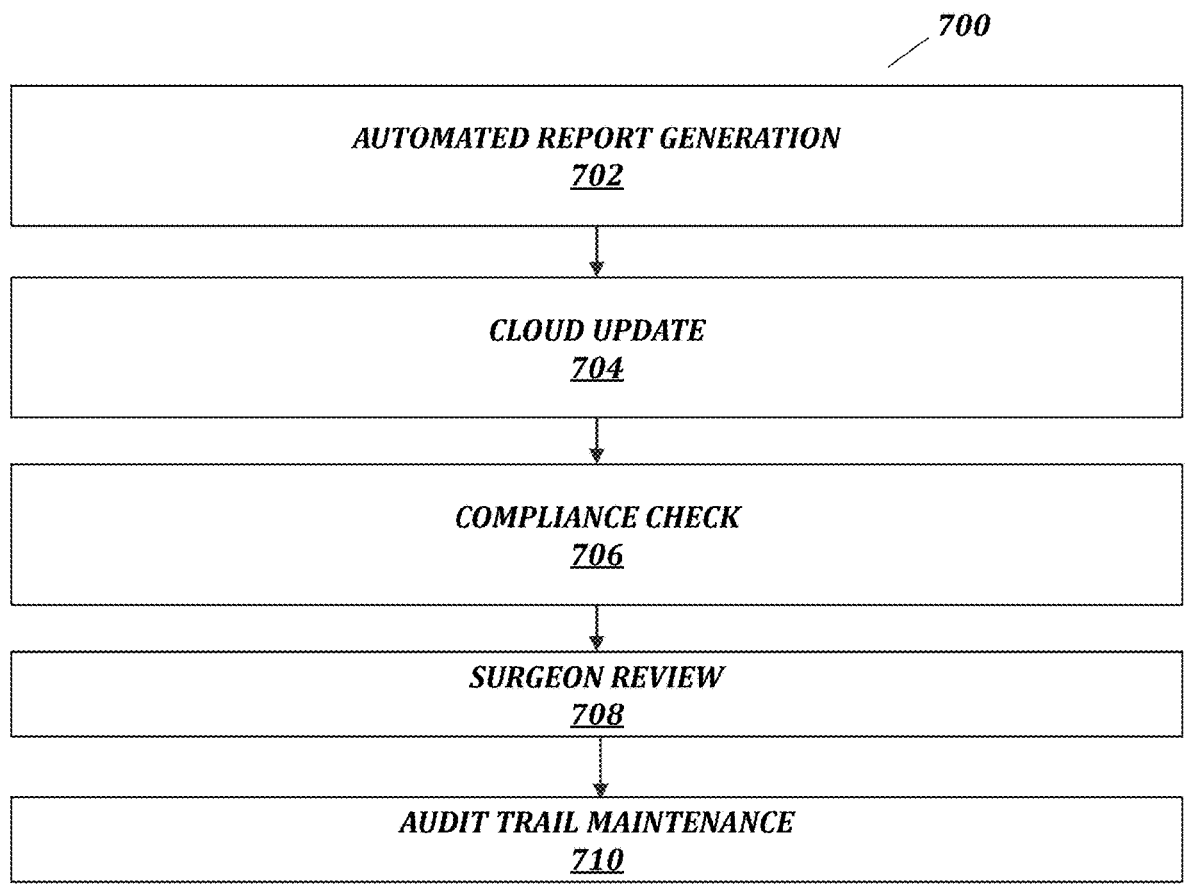
FIG. 7 is a schematic diagram illustrating a Postoperative Documentation Process Flow, in accordance with embodiments of the present disclosure.

FIG. 7 is a schematic diagram illustrating a Postoperative Documentation Process Flow 700, in accordance with embodiments of the present disclosure. Following surgery, the postoperative documentation process ensures accurate record-keeping and compliance. One or more stakeholders, including the surgeon, hospital staff, and/or compliance team, rely on an automated system to generate detailed surgical reports 702. These reports may include data such as resection angles, bone cut accuracy, alignment deviations, and any adjustments made by the surgeon during the procedure. To maintain regulatory compliance with HIPAA and FDA standards, the system securely uploads all documentation to a cloud-based storage 704 solution. Surgeons can implement compliance checks 706, review reports 708 and corresponding 3D models through a secure web portal, enabling post-surgical assessment and case analysis. Additionally, the system maintains comprehensive audit trails 710, logging timestamps, user actions, and access records to ensure accountability and data integrity.

Figure 8:
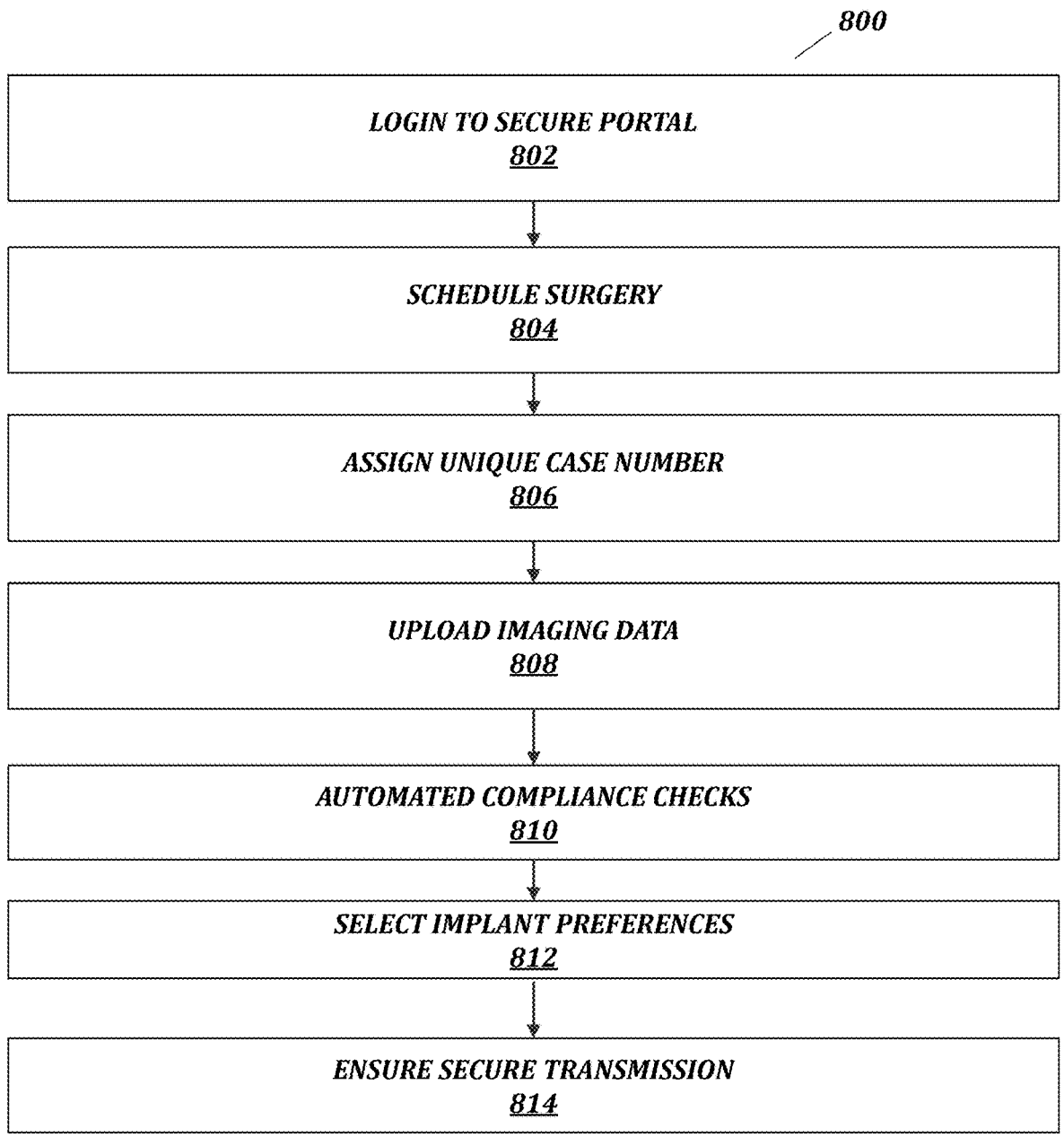
FIG. 8 is a schematic diagram illustrating a Surgical Case Scheduling and Data Management Flow, in accordance with embodiments of the present disclosure.

FIG. 8 is a schematic diagram illustrating a Surgical Case Scheduling and Data Management Flow 800, in accordance with embodiments of the present disclosure. The case scheduling and data upload process involves multiple stakeholders, including the surgeon, surgical coordinator, and IT staff, to ensure a secure and efficient workflow. The process begins when the surgeon or coordinator logs into the secure web portal 802 using multi-factor authentication. Once authenticated, the surgery is scheduled 804, and a unique case number 806 is assigned for tracking. Imaging data, such as CT or MRI DICOM files, is then uploaded 808, undergoing automated compliance checks 810 to verify format and quality. The surgeon selects specific preferences 812 for implant systems, alignment tolerances, and alternative scenarios to tailor the surgical plan. To maintain HIPAA compliance, all data is securely transmitted 814 using AES-256 encryption, ensuring the protection of sensitive patient information.

Figure 9:
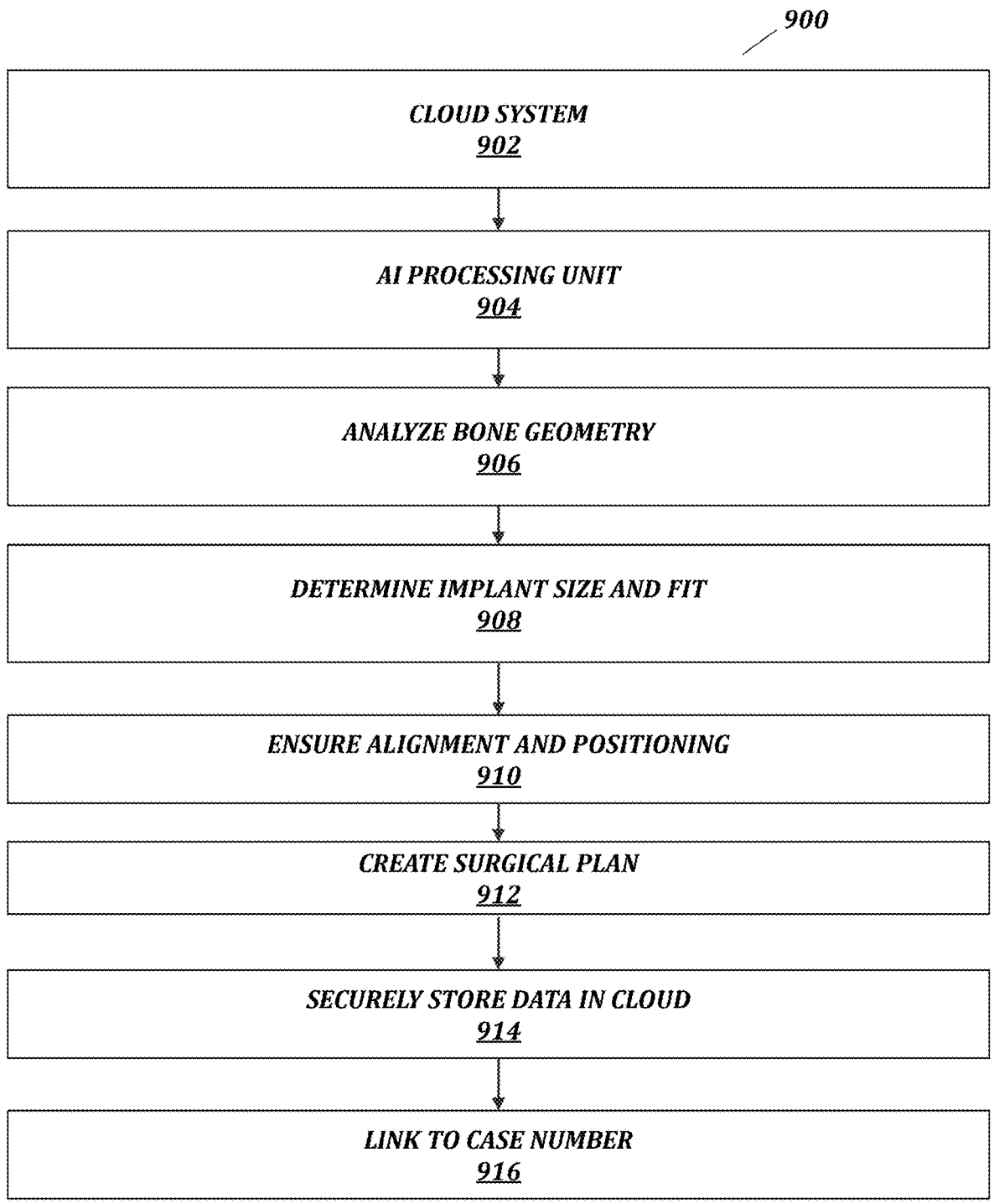
FIG. 9 is a schematic diagram illustrating an Automated Processing & Surgical Planning Flow, in accordance with embodiments of the present disclosure.

FIG. 9 is a schematic diagram illustrating an Automated Processing & Surgical Planning 900, in accordance with embodiments of the present disclosure. The automated processing and surgical planning phase has a cloud system 902 implementing an AI processing unit 904 to employ one or more machine learning algorithms to analyze bone geometry 906 to determine the selection of the optimal implant size and fit 908. These calculations consider alignment, spacing, and positioning 910 while adhering to the surgeon's specified preferences. The generated surgical plan 912 includes detailed implant models, positioning markers, and preloaded alternative scenarios for intraoperative adjustments. All relevant data is securely stored in the cloud 914 and linked to the unique case number 916, enabling seamless retrieval and integration into the surgical workflow.

Figure 10:
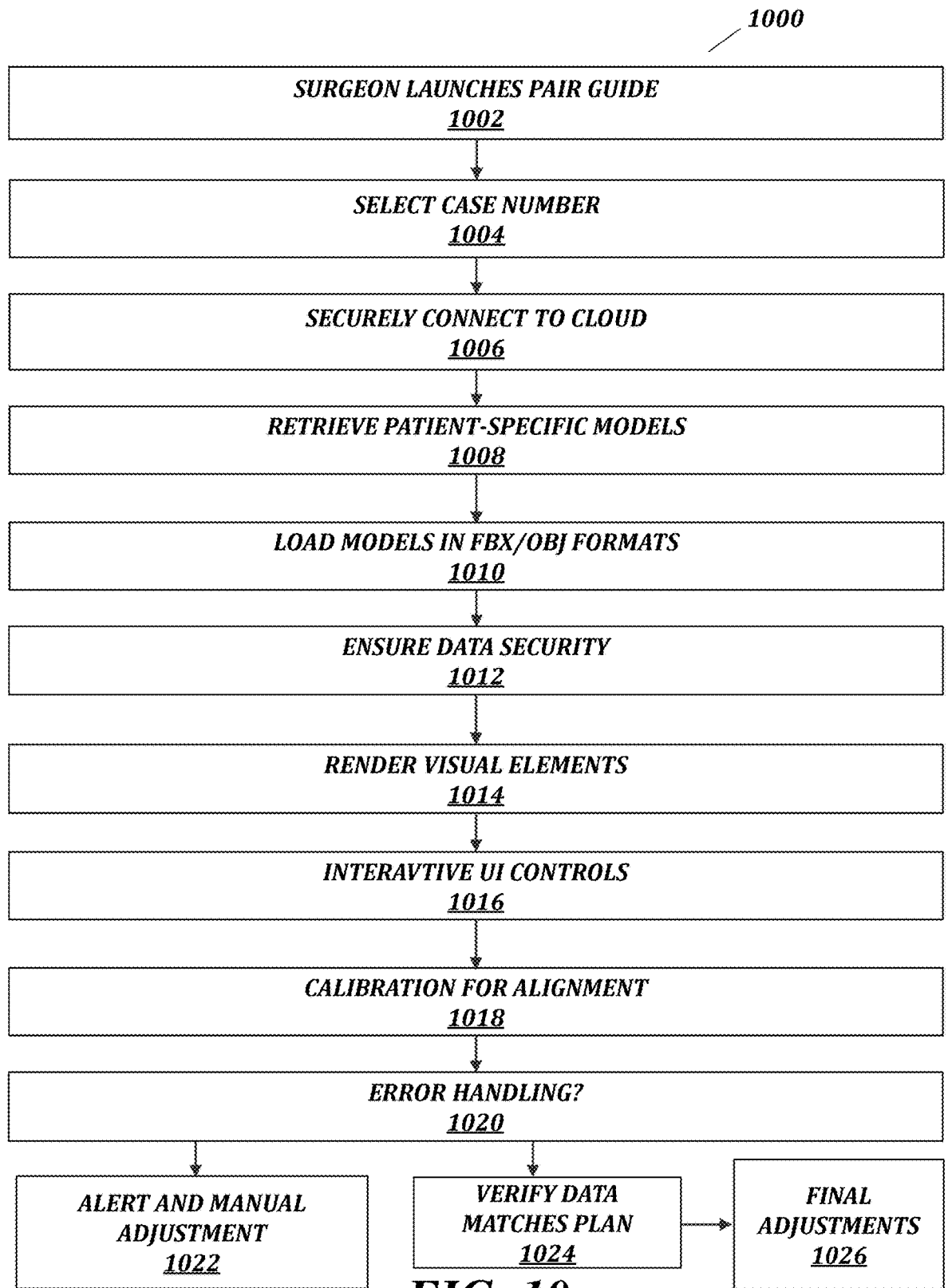
FIG. 10 is a schematic diagram illustrating an Augmented Reality Surgical Guidance Flow, in accordance with embodiments of the present disclosure.

FIG. 10 is a schematic diagram illustrating an Augmented Reality Surgical Guidance Flow 1000, in accordance with embodiments of the present disclosure. In the dynamic loading process within the Unity app, the surgeon and surgical team interact with an AR system to enhance intraoperative guidance. The process begins when the surgeon launches the Pair Guide 1002 in the operating room using AR glasses. Upon selecting the case number 1004 within the app, the system securely connects to the cloud 1006 to retrieve patient-specific implant models 1008 and surgical plans. The app dynamically loads implant models in formats 1010 such as FBX and OBJ, ensuring they are optimized for real-time AR rendering. To maintain compliance with HIPAA and FDA regulations, all data is securely transmitted using encrypted communication protocols to ensure data security 1012. The visual elements are rendered 1014 with adjustable transparency, scaling, and positioning to provide a clear view without obstructing the surgical field. Interactive UI controls 1016 and/or elements enable surgeons to toggle between different visualization layers, alignment markers, and alternative scenarios using voice commands, hand gestures, or touch controls. Built-in calibration ensures that 3D models align 1018 accurately with real-world anatomical landmarks. Additionally, error-handling mechanisms 1020 provide alerts for data load failures, calibration issues, or incomplete models, allowing for manual adjustments 1022 if necessary. Before proceeding, the system verifies 1024 that the loaded data matches the selected surgical plan, enabling surgeons to make any final adjustments 1026.

Figure 11:
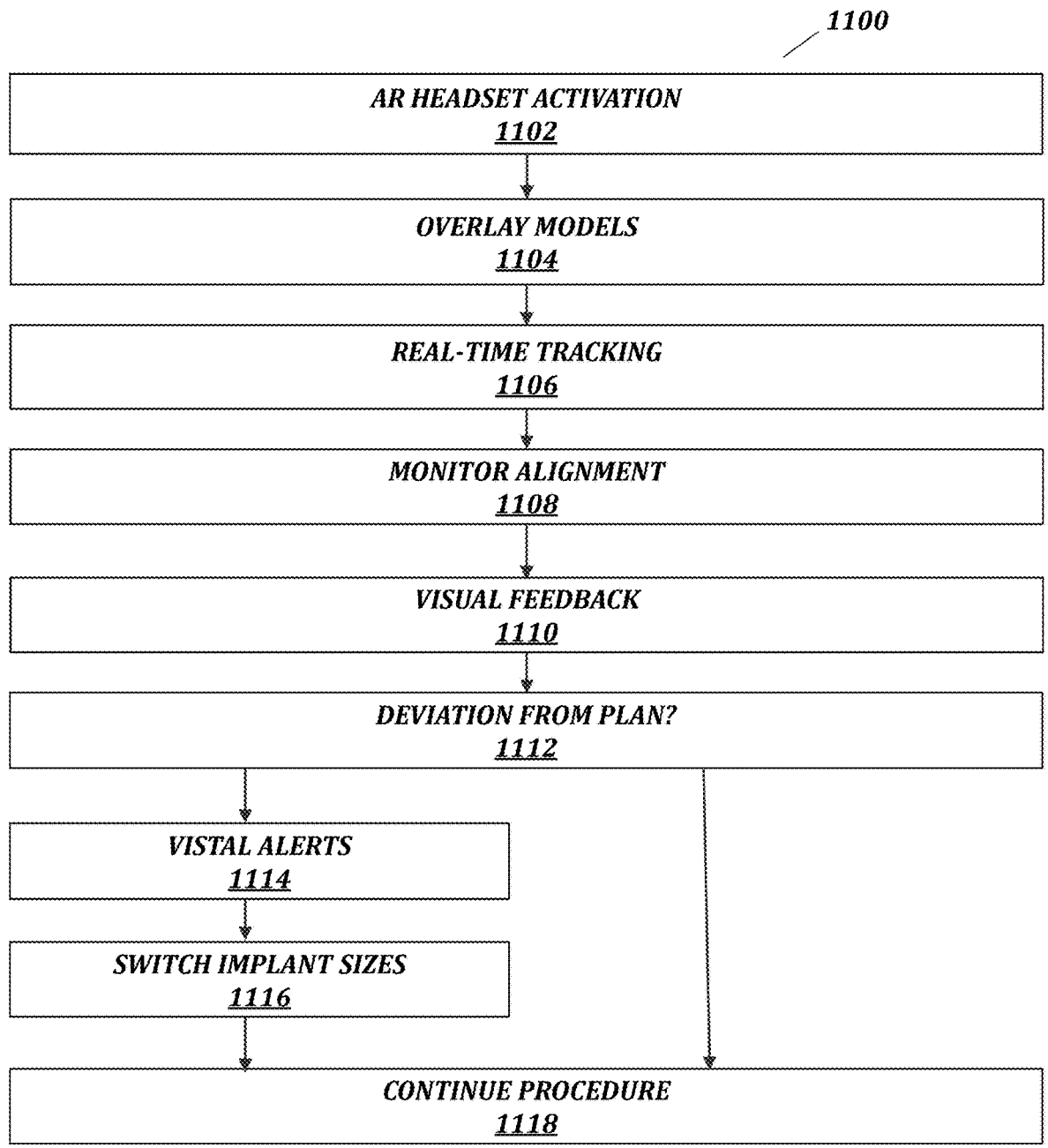
FIG. 11 is a schematic diagram illustrating an Intraoperative Guidance Process Flow, in accordance with embodiments of the present disclosure.

FIG. 11 is a schematic diagram illustrating an Intraoperative Guidance Process Flow 1100, in accordance with embodiments of the present disclosure. During intraoperative guidance, the surgeon and surgical team activates 1102 an AR headset to overlay 1104 anatomical and implant models directly onto the surgical site. Real-time tracking 1106 ensures precise instrument placement and alignment throughout the procedure. The system continuously monitors alignment 1108, spacing, and implant positioning, providing visual feedback 1110 to assist in maintaining surgical accuracy. If deviations 1112 from the surgical plan occur, visual alerts 1114 notify the surgeon, allowing for immediate adjustments. Additionally, surgeons can switch between alternative implant sizes 1116 and alignments using intuitive controls, ensuring optimal fit and positioning based on intraoperative conditions to continue the procedure 1118.

Figure 12:
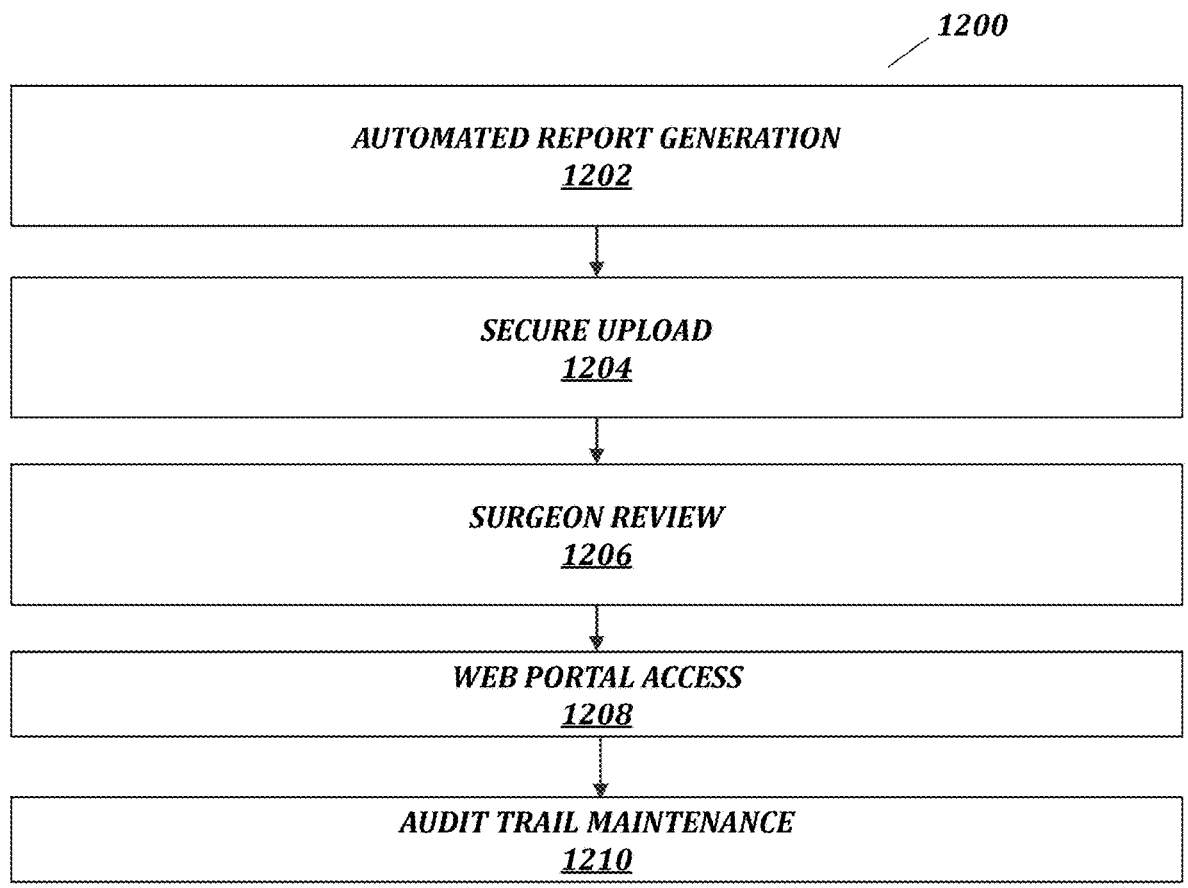
FIG. 12 is a schematic diagram illustrating a Postoperative Documentation Process Flow, in accordance with embodiments of the present disclosure.

FIG. 12 is a schematic diagram illustrating a Postoperative Documentation Process Flow 1200, in accordance with embodiments of the present disclosure. The postoperative documentation process involves the surgeon, hospital staff, and compliance team. Automated systems generate detailed reports 1202 that include implant size, positioning accuracy, and alignment data. Additionally, any deviations from the surgical plan are recorded for review 1206. The data is securely uploaded 1204 to ensure compliance with HIPAA and FDA regulations. Surgeons can access reports, 3D models, and performance metrics through a secure web portal 1208. To maintain transparency and accountability, the system logs audit trails 1210, including timestamps, user actions, and access records.

Figure 13:
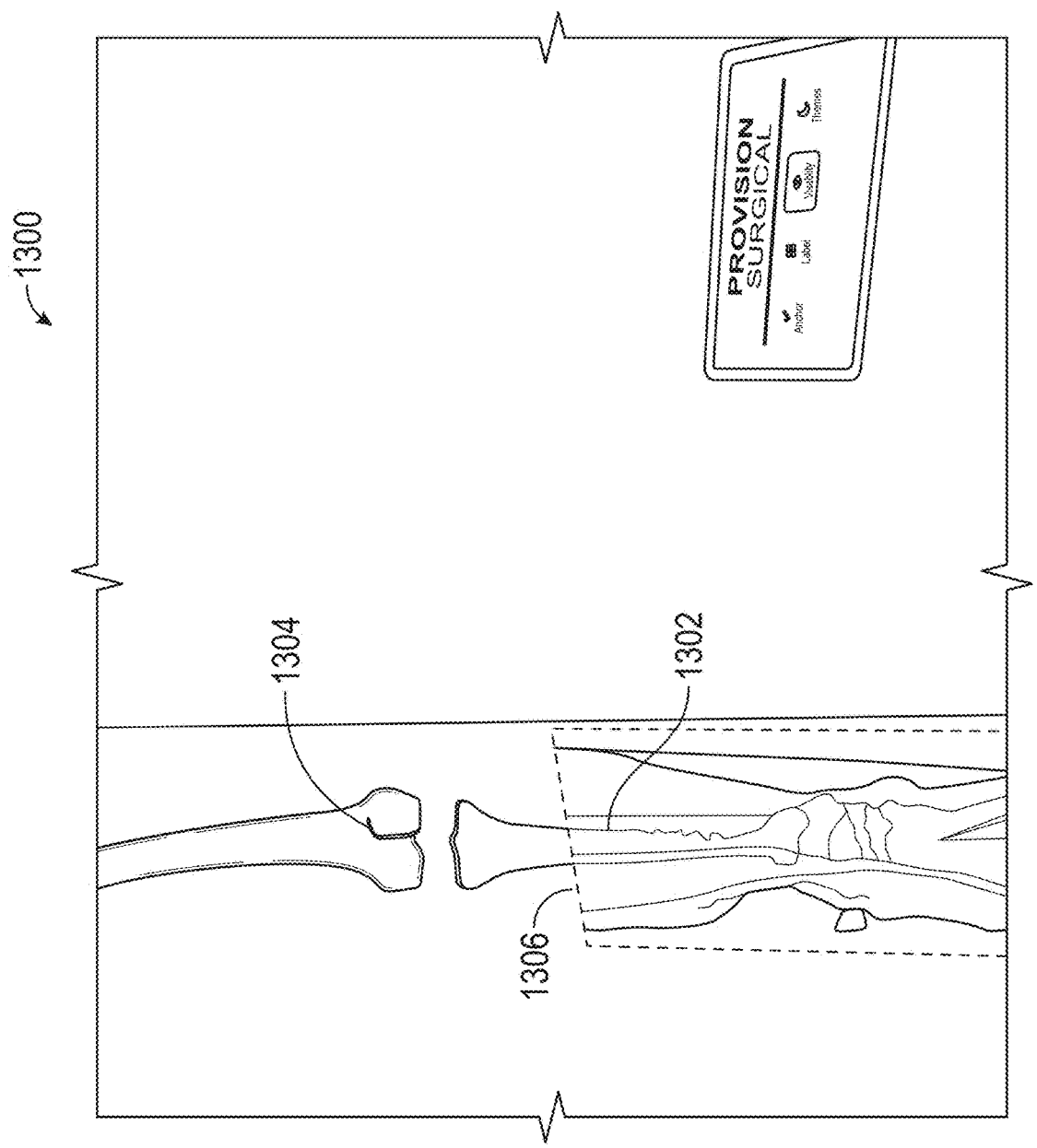
FIG. 13 is a schematic diagram illustrating a graphical user interface (GUI) implemented in a display of a head mounted wearable device (HMWD) such as a set of smart glasses, augmented reality (AR), and/or virtual reality (VR) glasses, in which the GUI presents a slicer tool box image, a slicer tool plane, a femur 3D model rendering, and a tibia 3D model rendering, in accordance with embodiments of the present disclosure, in accordance with embodiments of the present disclosure.

FIG. 13 is a schematic diagram illustrating a GUI implemented in a display 1300 of a head mounted wearable device (HMWD) such as a set of smart glasses, AR, and/or VR glasses, in which the GUI presents a slicer tool box image 1306, a slicer tool plane, a femur 3D model image 1304, and a tibia 3D model image 1302, in accordance with embodiments of the present disclosure.

Figure 14:
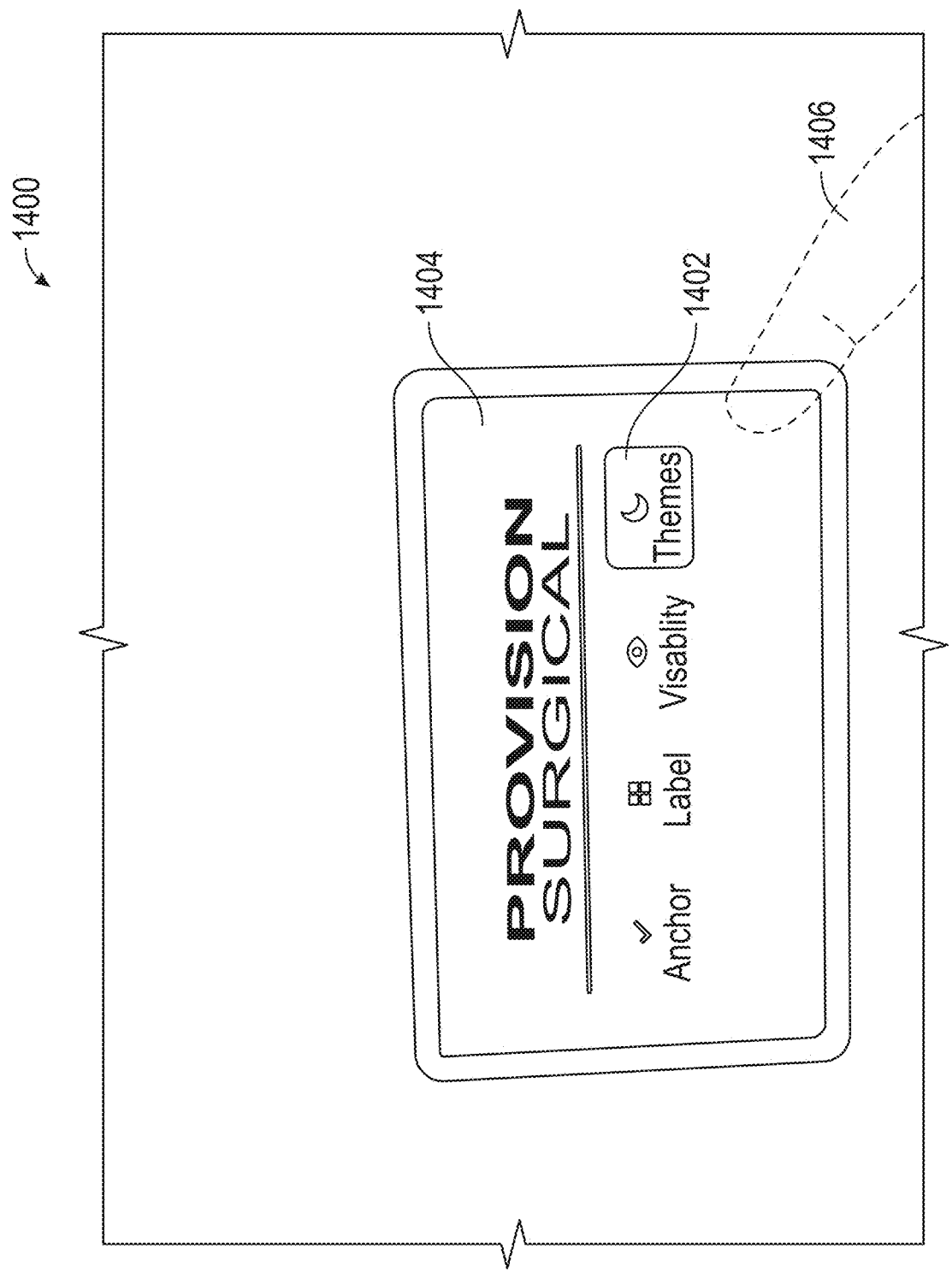
FIG. 14 is a schematic diagram illustrating a GUI implemented in a display of a head mounted wearable device (HMWD) such as a set of smart glasses, AR, and/or VR glasses of FIG. 13, in which the GUI presents a visibility menu image, in accordance with embodiments of the present disclosure.

FIG. 14 is a schematic diagram illustrating a GUI implemented in a display 1400 of a head mounted wearable device (HMWD) such as a set of smart glasses, AR, and/or VR glasses of FIG. 13, in which the GUI presents a visibility menu image 1404 with one or more buttons 1402 for a user 1406 to select one or more preferences.

Figure 15:
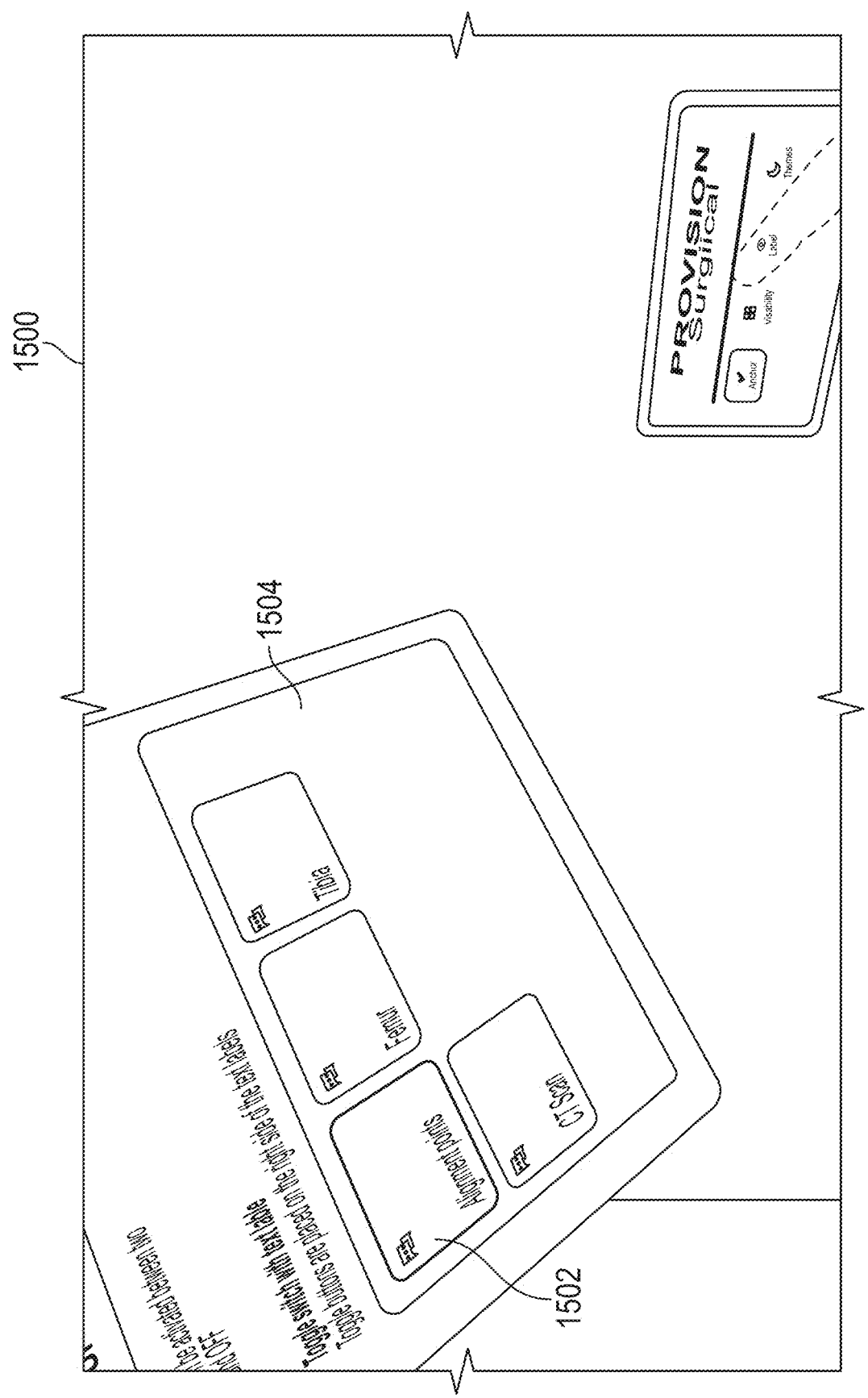
FIG. 15 is a schematic diagram illustrating a GUI implemented in a display of a head mounted wearable device (HMWD) such as a set of smart glasses, AR, and/or VR glasses of FIG. 13, in which the GUI presents an anchoring menu image implementing a virtual locking system configured to lock one or more images and three dimensional renderings in space rather than allowing them to move, in accordance with embodiments of the present disclosure.

FIG. 15 is a schematic diagram illustrating a GUI 1500 implemented in a display of a head mounted wearable device (HMWD) such as a set of smart glasses, AR, and/or VR glasses of FIG. 13, in which the GUI presents an anchoring menu image 1504 implementing a virtual locking system with one or more toggle switches 1502 configured to lock one or more images in space rather than allowing them to move.

Figure 16:
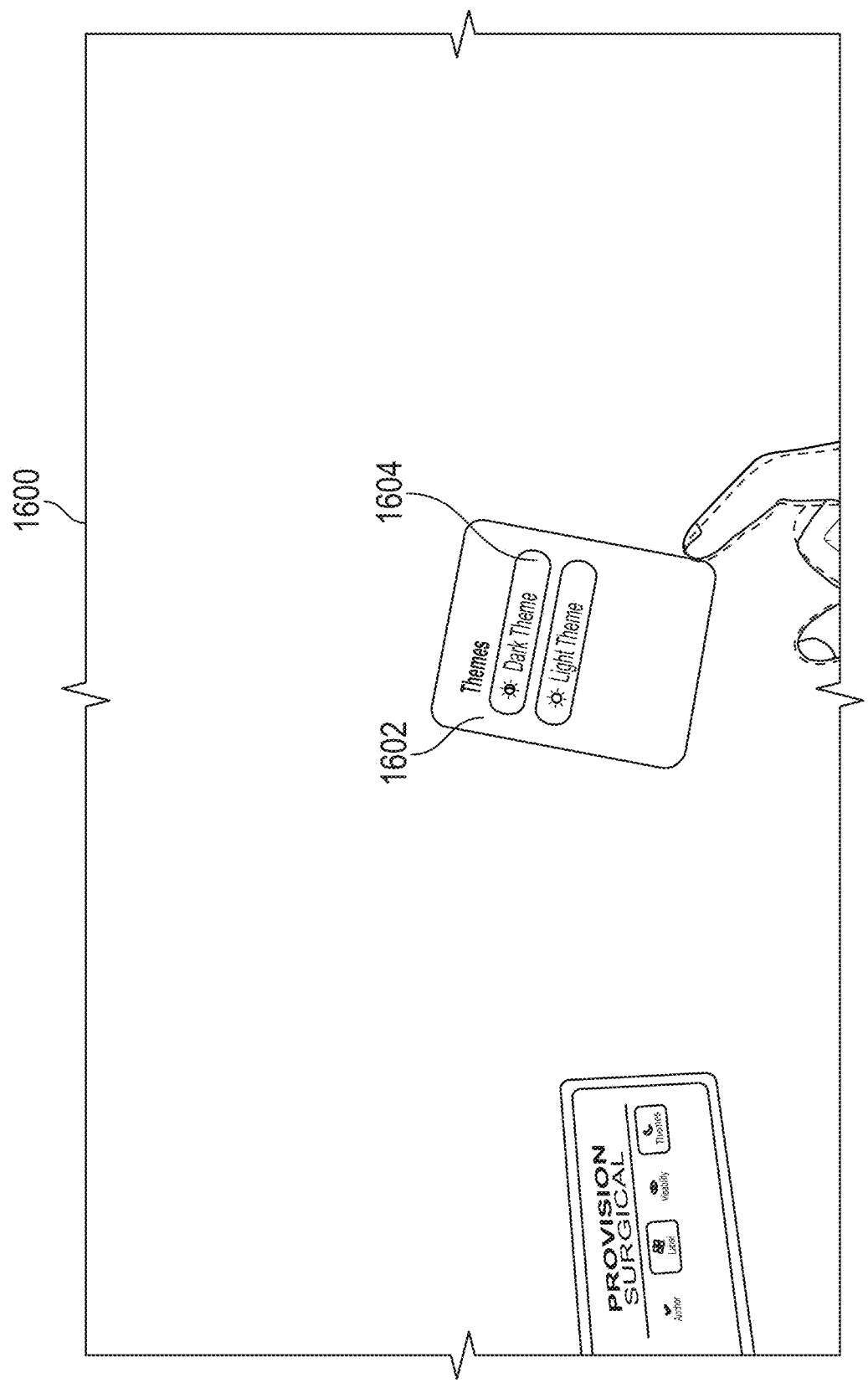
FIG. 16 is a schematic diagram illustrating a GUI implemented in a display of a head mounted wearable device (HMWD) such as a set of smart glasses, AR, and/or VR glasses of FIG. 13, in which the GUI presents a theme toggle Light/Dark image, in accordance with embodiments of the present disclosure.

FIG. 16 is a schematic diagram illustrating a GUI 1600 implemented in a display of a head mounted wearable device (HMWD) such as a set of smart glasses, AR, and/or VR glasses of FIG. 13, in which the GUI presents a theme toggle 1602 such as a lite theme and/or a dark theme icon 1604.

Figure 17:
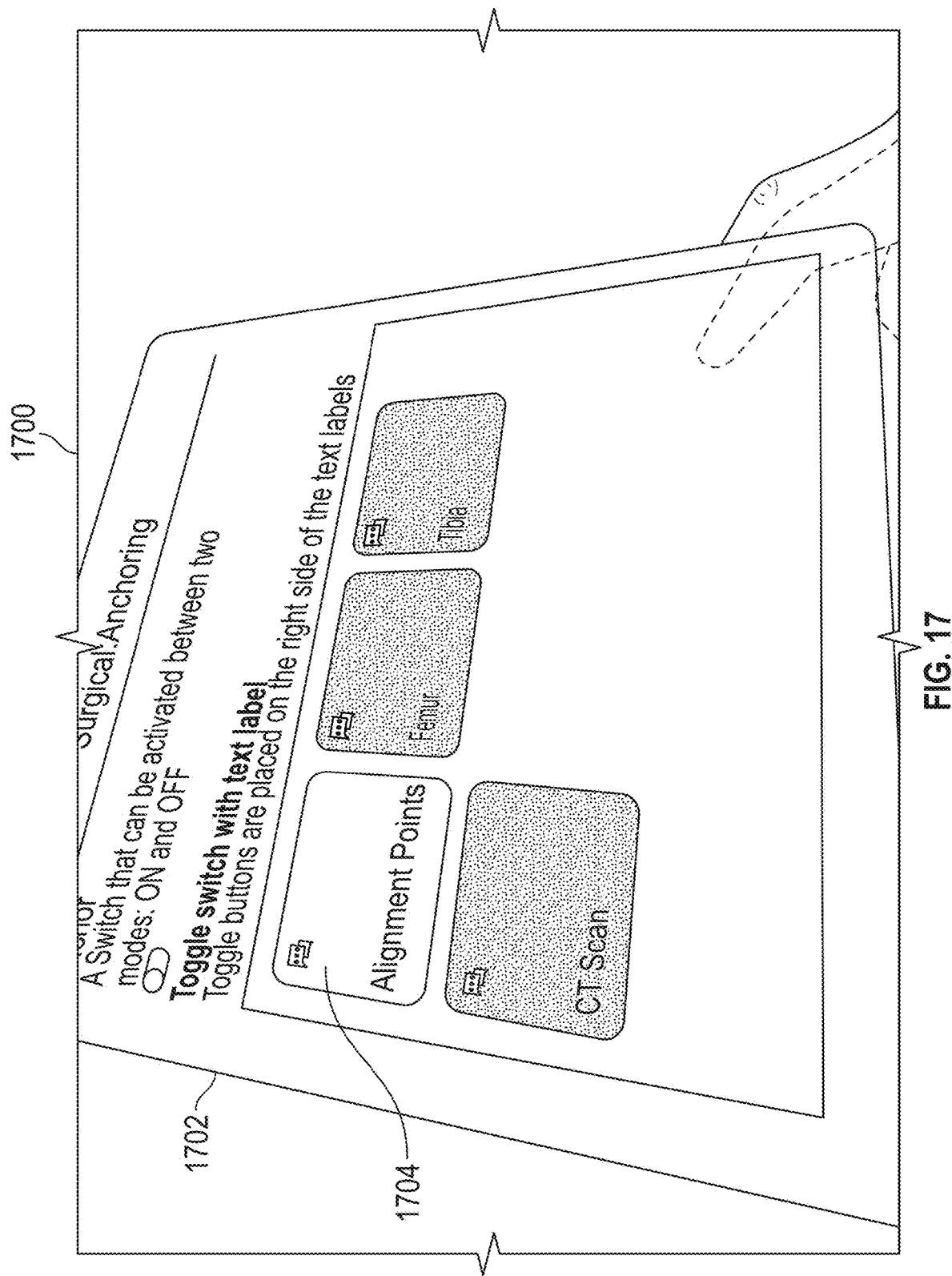
FIG. 17 is a schematic diagram illustrating a GUI implemented in a display of a head mounted wearable device (HMWD) such as a set of smart glasses, AR, and/or VR glasses of FIG. 13, in which the GUI presents an anchoring menu image implementing a virtual locking system configured to lock one or more three dimensional visualized models in space rather than allowing them to move freely, in accordance with embodiments of the present disclosure.

FIG. 17 is a schematic diagram illustrating a GUI 1700 implemented in a display of a head mounted wearable device (HMWD) such as a set of smart glasses, AR, and/or VR glasses of FIG. 13, in which the GUI presents an anchoring menu image 1702 implementing a virtual locking system with one or more toggle switches 1704 configured to lock one or more visualized three dimensional models/renders in space rather than allowing them to move.

Figure 18:
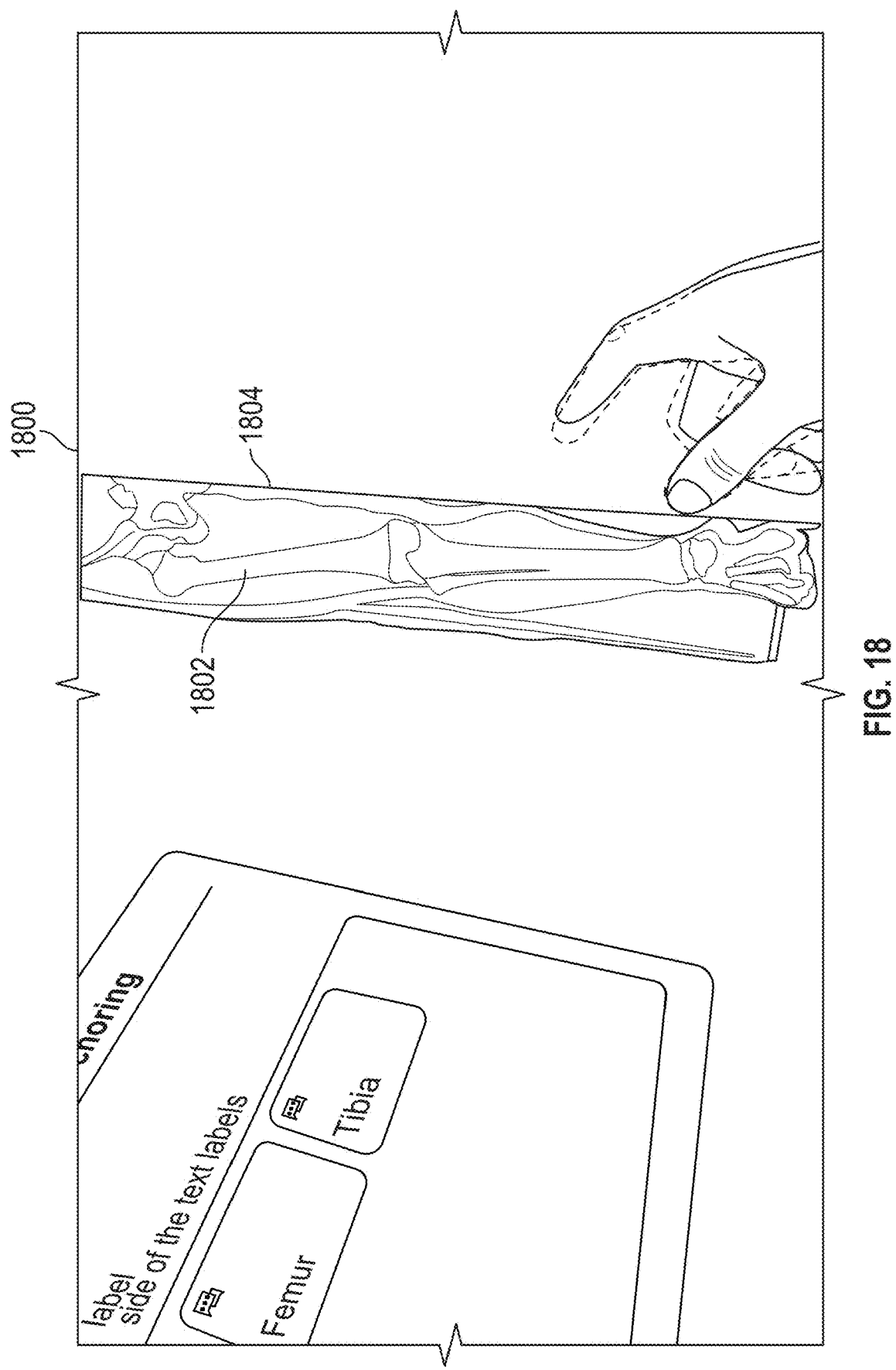
FIG. 18 is a schematic diagram illustrating a GUI implemented in a display of a head mounted wearable device (HMWD) such as a set of smart glasses, AR, and/or VR glasses of FIG. 13, in which the GUI presents a hand interaction image of a close grab function and a distance grab function and a CT plane viewer image, in accordance with embodiments of the present disclosure.

FIG. 18 is a schematic diagram illustrating a GUI 1800 implemented in a display of a head mounted wearable device (HMWD) such as a set of smart glasses, AR, and/or VR glasses of FIG. 13, in which the GUI presents a hand interaction image of a close grab function and a distance grab function and a CT plane viewer image 1804 of a femur three dimensional model 1802.

Figure 19:
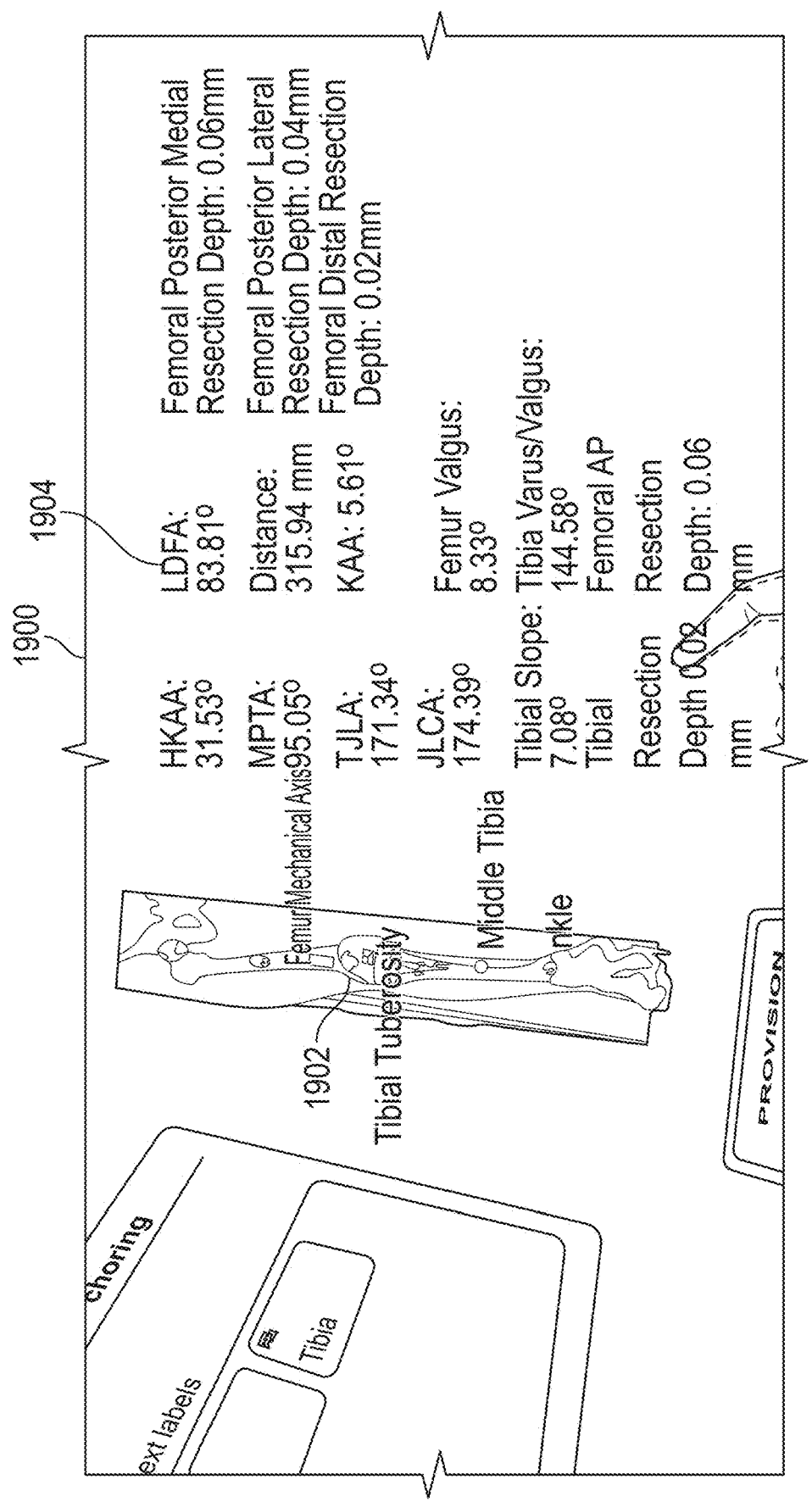
FIG. 19 is a schematic diagram illustrating a GUI implemented in a display of a head mounted wearable device (HMWD) such as a set of smart glasses, AR, and/or VR glasses of FIG. 13, in which the GUI presents a measurement image of one or more predetermined areas of interest, in accordance with embodiments of the present disclosure.

FIG. 19 is a schematic diagram illustrating a GUI 1900 displayed on a head-mounted wearable device, such as smart glasses or AR and VR glasses. This interface presents a measurement display highlighting predetermined areas 1902 of interest related to surgical alignment and anatomical assessment. The GUI 1900 provides measurements 1904 for the femur mechanical axis, middle tibia, ankle, and/or hip-knee-ankle angle. It also includes lateral distal femoral angle, medial proximal tibial angle, total joint line angle, and/or joint line convergence angle. Additional measurements involve tibial slope, tibial resection depth, femoral anteroposterior resection depth, femoral posterior medial resection depth, femoral posterior lateral resection depth, and/or femoral distal resection depth. The system further provides distance measurements, knee adduction angle, femur valgus, and/or tibia varus/valgus assessments. This comprehensive set of measurements ensures precise alignment and surgical planning when using the wearable device for augmented reality-assisted procedures.

In an embodiment, the AR surgical interface may correspond to the AR surgical interface described earlier. This interface may include high-resolution displays, spatial tracking sensors, a processor, and wireless communication capabilities. The high-resolution displays are configured to provide clear and detailed visualizations of three-dimensional models and metrics, which are overlaid onto the surgeon's field of view. The spatial tracking sensors are designed to accurately track the position and orientation of the AR interface relative to the patient and the surgical field. This tracking ensures precise alignment of the augmented reality overlay with the real-world environment.

In some embodiments, the processor is configured to manage the real-time rendering of the three-dimensional models and metrics, process user inputs, and coordinate with other system components. The wireless communication capabilities allow for real-time data exchange with other elements of the augmented reality surgical assistance system.

In some embodiments, patient imaging data is input into the system and processed by an imaging translation server, which generates three-dimensional models and calculates biomechanical metrics. These processed data are then transmitted to AR glasses, which render the models and metrics, overlaying them onto the surgeon's field of view. User interactions, such as gestures or tool movements, are detected by the AR glasses and used to manipulate the displayed models and metrics. The interaction data is sent back to the imaging translation server, which updates the models and metrics accordingly. This feedback loop ensures real-time adjustments and continuous alignment with the surgical plan.

As noted above, in an exemplary user interface for the augmented reality surgical assistance system, as displayed via the AR surgical interface, the interface includes a three-dimensional model display area, which shows rendered bone structures and implants overlaid onto the surgeon's field of view. A metrics display area shows the calculated biomechanical and alignment metrics associated with the displayed models. Interactive elements allow the surgeon to manipulate the displayed models and metrics, such as rotating the view, zooming in or out, or selecting different implant sizes. Additionally, a surgical progress indicator provides real-time feedback on the alignment of the current surgical state with the preoperative plan.

In one or more embodiments, additional information, such as patient data, surgical notes, or system status, may also be displayed as needed. The layout and content of the user interface may be customizable to suit individual surgeon preferences and specific surgical procedures. The systems and methods described herein may provide several advantages over traditional surgical approaches. By integrating precise bone and implant rendering with meaningful biomechanical metrics in an augmented reality environment, surgeons may benefit from enhanced visual insights and real-time feedback during surgical procedures. The ability to manipulate three-dimensional models and view detailed metrics in real-time may enable more accurate implant positioning and alignment. This may lead to improved surgical outcomes, reduced complications, and potentially shorter recovery times for patients.

Figure 20:
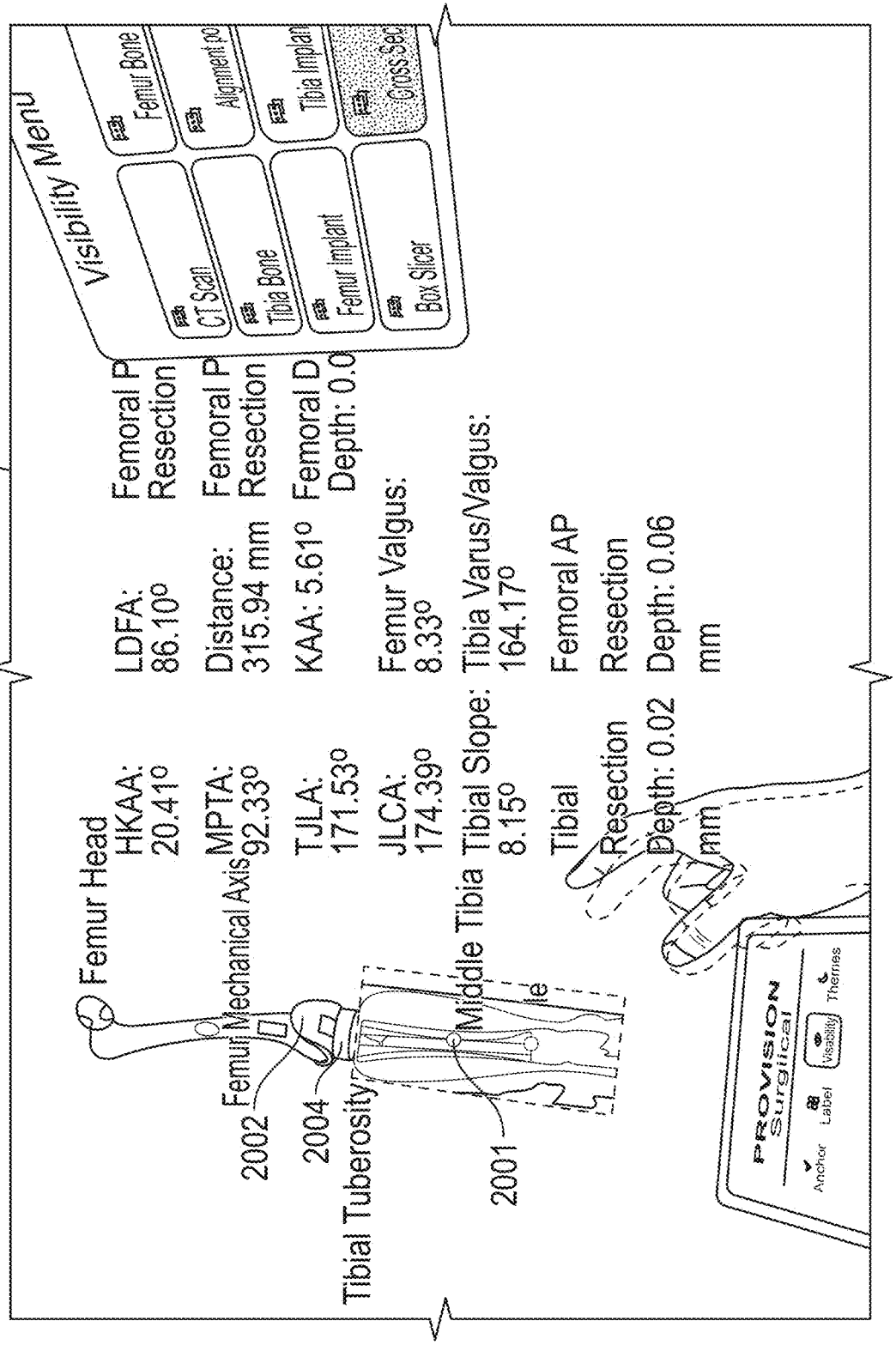
FIG. 20 is a schematic diagram illustrating a GUI 2000 implemented in a display of a head mounted wearable device (HMWD) such as a set of smart glasses, AR, and/or VR glasses of FIG. 13, in which the GUI presents a hand interaction image of a close grab function and a distance grab function, in accordance with embodiments of the present disclosure.

FIG. 20 is a schematic diagram illustrating a GUI 2000 implemented in a display of a head mounted wearable device (HMWD) such as a set of smart glasses, AR, and/or VR glasses of FIG. 13, in which the GUI presents a hand interaction image of a close grab function and a distance grab function, as well as one or more alignment points 2001, a femur implant model rendering 2002, and a tibia implant model rendering 2004.

Figure 21:
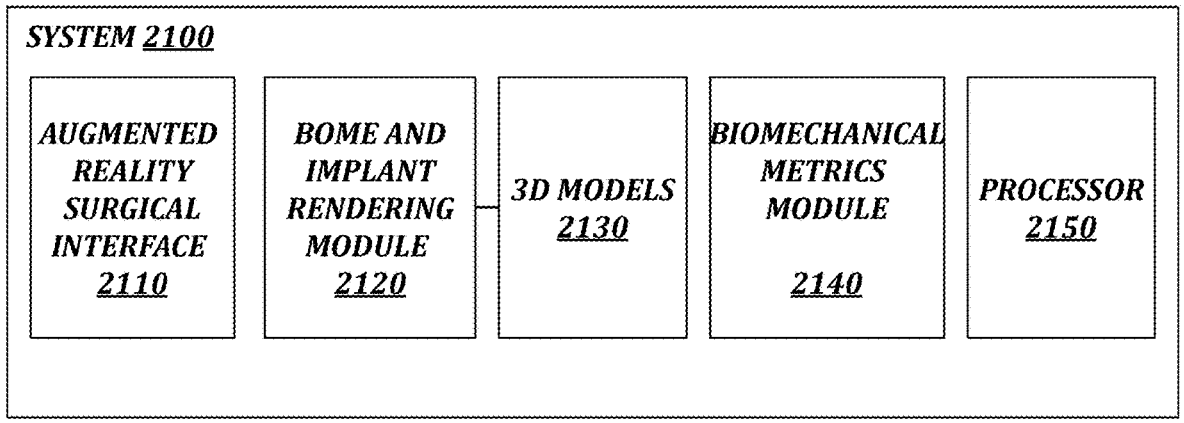
FIG. 21 is a block diagram illustrating a system, according to some embodiments of the present disclosure.

FIG. 21 illustrates a block diagram of a system 2100, in accordance with some embodiments of the present disclosure. The system 2100 comprises an augmented reality surgical interface 2110 configured to be worn by a user, a bone and implant rendering module 2120 configured to generate three-dimensional models 2130 based on patient imaging data, a biomechanical metrics module 2140 configured to calculate biomechanical and alignment metrics, and a processor 2150 configured to integrate the three-dimensional models and biomechanical metrics 2314 for display via the augmented reality surgical interface 2110.

In some embodiments, the system 2100 further comprises an interactive manipulation interface configured to enable user interaction with the three-dimensional models and biomechanical metrics through at least one of hand gestures or external tool movements. Additionally, the system 2100 may include a metrics viewer configured to provide detailed visual representations of the biomechanical and alignment metrics. In some embodiments, the processor 2150 is further configured to update the integrated three-dimensional models and biomechanical metrics based on surgical progress, thereby ensuring real-time adjustments to enhance surgical accuracy and alignment.

The system may include an AR surgical interface, a bone and implant rendering module, a biomechanical metrics module, an interactive manipulation interface, a metrics viewer, and a data processing unit. These components are interconnected via a communication system. The AR surgical interface may consist of custom-designed AR glasses or a headset equipped with high-resolution displays and spatial tracking sensors. This interface is configured to overlay three-dimensional models and biomechanical metrics onto the surgeon's field of view during a surgical procedure. The bone and implant rendering module is designed to generate precise three-dimensional models of bone structures and surgical implants based on patient imaging data. In some embodiments, the module employs advanced algorithms to translate medical imaging data into AR-compatible formats with high anatomical accuracy and real-time performance. The biomechanical metrics module calculates and displays various biomechanical and alignment metrics, including but not limited to the Hip-Knee-Ankle Angle, Lateral Distal Femoral Angle, Medial Proximal Tibial Angle, Tibiofemoral Joint Line Angle, Knee Ankle Angle, Joint Line Convergence Angle, femur valgus from the anatomical axis, tibia varus/valgus from the anatomical axis, flexion/extension, and tibial slope on the lateral view.

The interactive manipulation interface enables the manipulation of three-dimensional models and metrics through hand gestures or external tools, providing the surgeon with real-time control over different parameters during the surgical procedure. The metrics viewer offers detailed views of biomechanical and alignment metrics, allowing surgeons to access comprehensive metric data for informed decision-making during surgical planning and execution. The data processing unit includes one or more processors that process patient imaging data, generate three-dimensional models, calculate biomechanical metrics, and integrate these elements for display through the AR surgical interface. It also manages real-time updates and synchronization across system components. The communication system facilitates data transfer between the components, utilizing wireless communication protocols to ensure real-time data exchange between the AR surgical interface and other system components.

Figure 22:
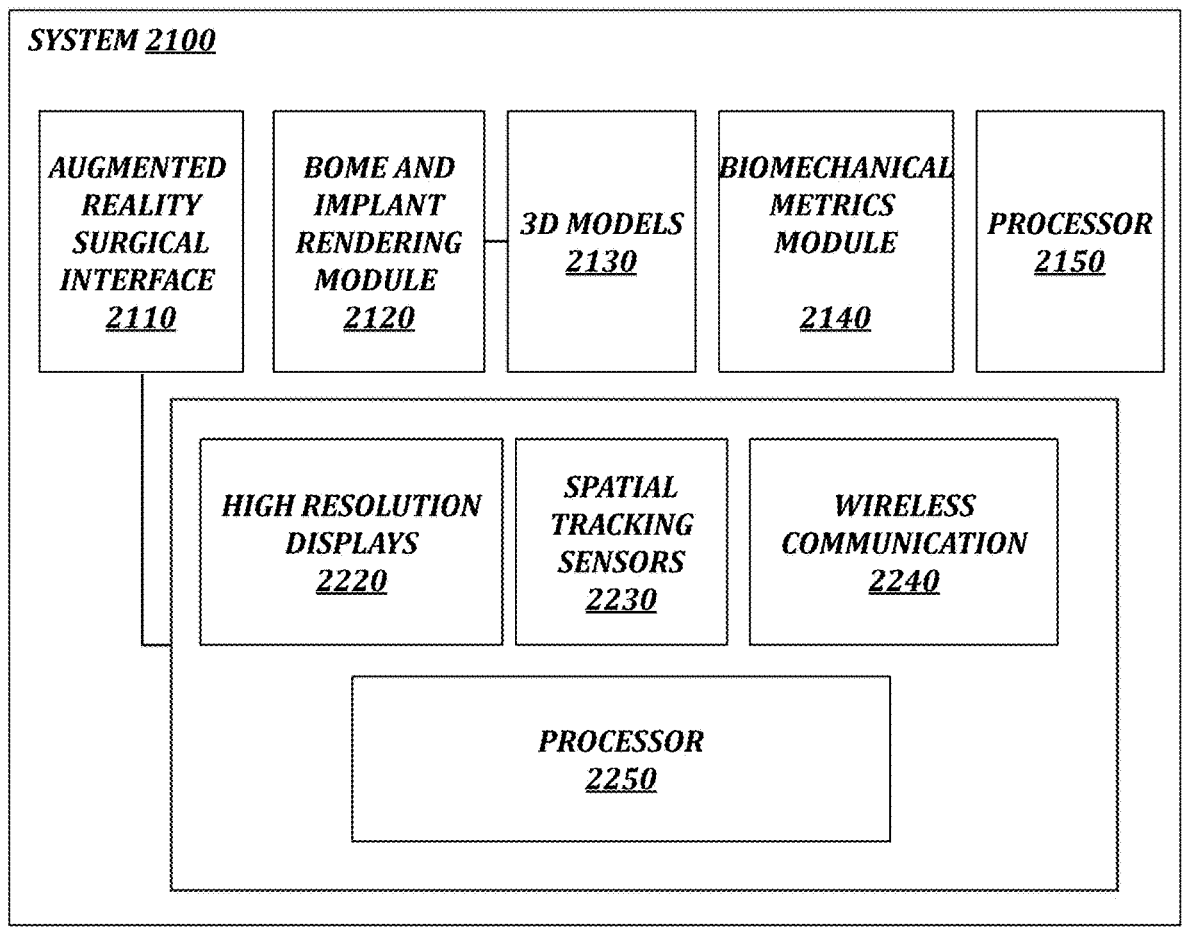
FIG. 22 is a block diagram further illustrating the system from FIG. 21, according to some embodiments of the present disclosure.

FIG. 22 illustrates the system 2100, as illustrated in FIG. 21, in accordance with some embodiments of the present disclosure. In some embodiments, the augmented reality surgical interface 2110 comprises high-resolution displays 2220 configured to present biomechanical and alignment metrics within the surgeon's field of view, spatial tracking sensors 2230 configured to enable precise real-time positioning and alignment, a processor 2250 configured for real-time rendering of three-dimensional models and biomechanical data, and wireless communication capabilities 2240 configured to facilitate data transmission between the augmented reality surgical interface 2110 and other system components.

Figure 23:
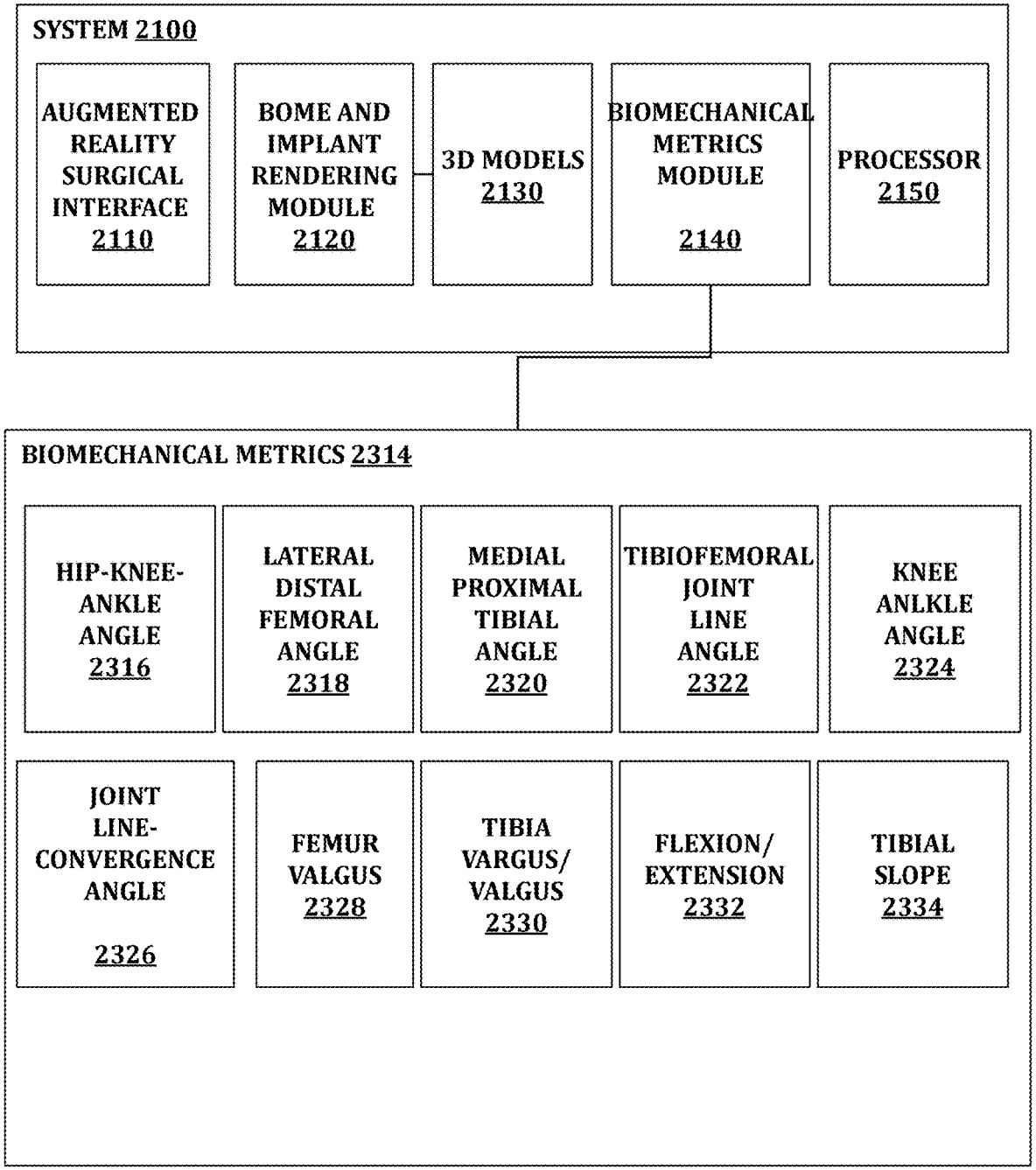
FIG. 23 is a block diagram further illustrating the system from FIG. 21, according to some embodiments of the present disclosure.

FIG. 23 is a block diagram that further describes the system 2100 from FIG. 21, according to some embodiments of the present disclosure. In some embodiments, the biomechanical metrics 2314 may include Hip-Knee-Ankle Angle 2316 (HKAA), lateral Distal Femoral Angle 2318 (LDFA), medial Proximal Tibial Angle 2320 (MPTA), tibiofemoral Joint Line Angle 2322 (TJLA), knee Ankle Angle 2324 (KAA), joint Line Convergence Angle 2326 (JLCA), femur valgus 2328 from anatomical axis, tibia varus/valgus 2330 from anatomical axis, flexion/extension 2332, and tibial slope 2334 on the lateral view.

Figure 24:
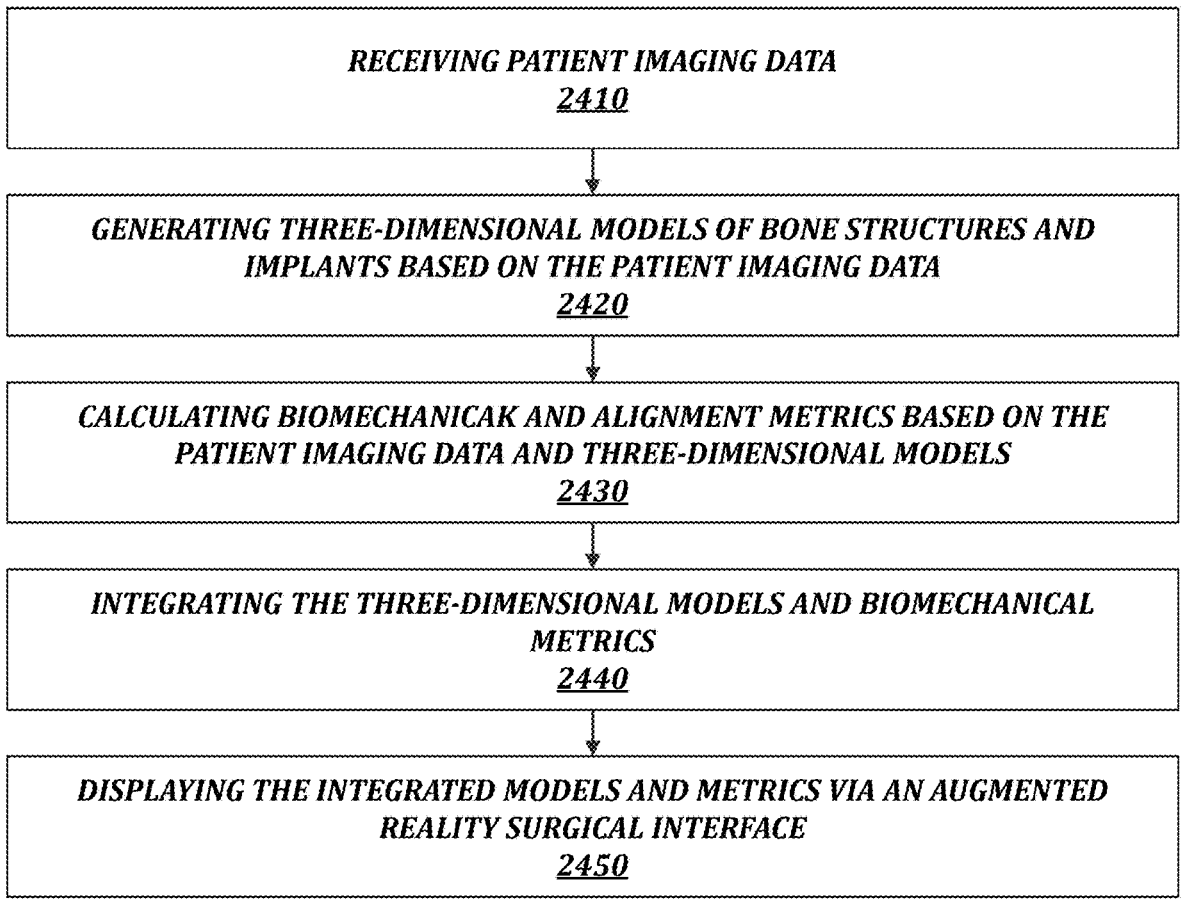
FIG. 24 is a flowchart illustrating a method for providing augmented reality surgical assistance, according to some embodiments of the present disclosure.

FIG. 24 is a flowchart that describes a method for providing augmented reality surgical assistance, according to some embodiments of the present disclosure. In some embodiments, at 2410, the method may include receiving patient imaging data. At 2420, the method may include generating three-dimensional models of bone structures and implants based on the patient imaging data. At 2430, the method may include calculating biomechanical and alignment metrics based on the patient imaging data and three-dimensional models. At 2440, the method may include integrating the three-dimensional models and biomechanical metrics. At 2450, the method may include displaying the integrated models and metrics via an augmented reality surgical interface.

In some embodiments, the method includes updating the displayed three-dimensional models and biomechanical metrics in real time based on surgical progress. The biomechanical metrics may comprise at least one of the following: Hip-Knee-Ankle Angle (HKAA), Lateral Distal Femoral Angle (LDFA), Medial Proximal Tibial Angle (MPTA), Tibiofemoral Joint Line Angle (TJLA), Knee Ankle Angle (KAA), Joint Line Convergence Angle (JLCA), femur valgus relative to the anatomical axis, tibia varus/valgus relative to the anatomical axis, flexion/extension, and tibial slope in the lateral view. Additionally, the method may include providing detailed visual representations of these biomechanical and alignment metrics through a metrics viewer. Furthermore, in some embodiments, the method includes storing the final states of the models and metrics for post-operative analysis.

As noted above, the process may begin by receiving patient imaging data, which may include, but is not limited to, computed tomography (CT) scans, magnetic resonance imaging (MRI) scans, X-rays, or other medical imaging modalities. Next, three-dimensional models of bone structures and implants are generated based on the received imaging data. This is accomplished by the bone and implant rendering module using advanced algorithms that translate medical imaging data into AR-compatible formats. Biomechanical and alignment metrics are then calculated based on the patient imaging data and the generated three-dimensional models. These calculations may involve determining various angles, distances, and other relevant parameters and are performed by the biomechanical metrics module. Following this, the three-dimensional models and biomechanical metrics are integrated. This step aligns the metrics with corresponding anatomical landmarks in the models and prepares the combined data for augmented reality display. Finally, the integrated models and metrics are displayed through the augmented reality surgical interface. This step overlays the three-dimensional models and associated metrics onto the surgeon's field of view via the AR interface. Additional steps may include receiving user input to manipulate the displayed models and metrics, updating the display based on surgical progress, and storing the final model and metric states for post-operative analysis.

Figure 25:
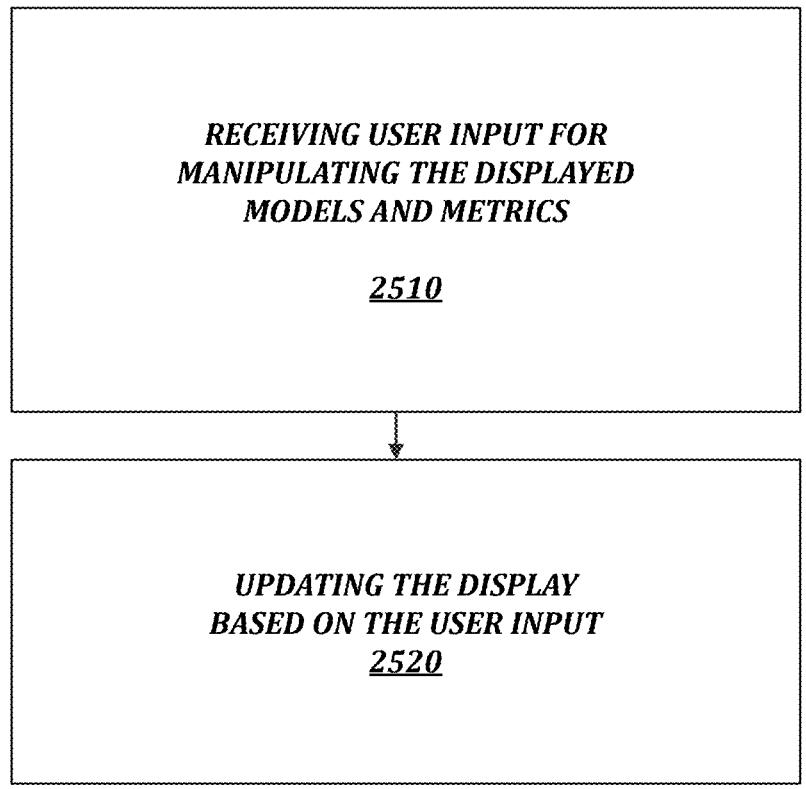
FIG. 25 is a flowchart further illustrating the method for providing augmented reality surgical assistance from FIG. 24, according to some embodiments of the present disclosure.

FIG. 25 is a flowchart that further describes the method for providing augmented reality surgical assistance from FIG. 24, according to some embodiments of the present disclosure. In some embodiments, at 2510, the method may include receiving user input for manipulating the displayed models and metrics. At 2520, the method may include updating the display based on the user input. In some embodiments, the user input comprises at least one of hand gestures or external tool movements.

FIG. 26 is a block diagram illustrating a non-transitory computer-readable medium storing instructions 2600, according to some embodiments of the present disclosure. The stored instructions, when executed, enable the system to perform various operations. In some embodiments, the instructions include receiving patient imaging data and generating three-dimensional models of bone structures and implants based on the imaging data. Additionally, the instructions include calculating biomechanical and alignment metrics using the patient imaging data and the generated three-dimensional models. The three-dimensional models and biomechanical metrics 2314 are then integrated and transmitted for display via an augmented reality surgical interface.

In some embodiments, the instructions further include receiving user input for manipulating the models and metrics, which may be provided through hand gestures or external tool movements. The system updates the integrated models and metrics in response to user input and dynamically adjusts them based on surgical progress. Additionally, in some embodiments, the instructions include storing the final states of the models and metrics for post-operative analysis.

FIG. 27 is a block diagram that further describes the non-transitory computer-readable medium storing instructions 2600 from FIG. 26, according to some embodiments of the present disclosure. In some embodiments, the biomechanical metrics 2314 may include Hip-Knee-Ankle Angle 2316 (HKAA), lateral Distal Femoral Angle 2318 (LDFA), medial Proximal Tibial Angle 2320 (MPTA), tibiofemoral Joint Line Angle 2322 (TJLA), knee Ankle Angle 2324 (KAA), joint Line Convergence Angle 2326 (JLCA), femur valgus 2328 from anatomical axis, tibia varus/valgus 2330 from anatomical axis, flexion/extension 2332, and tibial slope 2334 on the lateral view.

Figure 28:
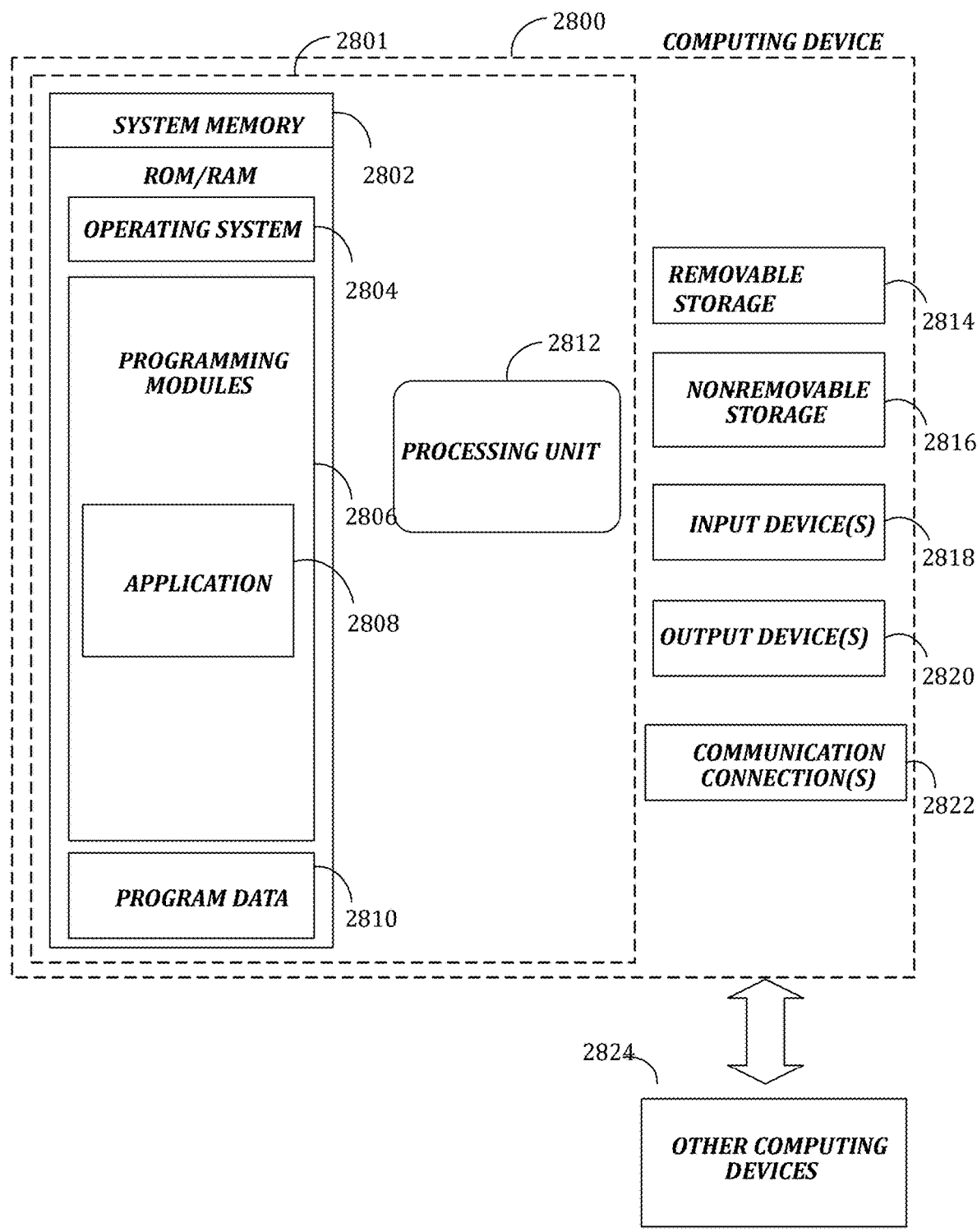
FIG. 28 is a block diagram illustrating an example computing device that may be used to implement various aspects of the system, in accordance with various embodiments.

Referring to FIG. 28, FIG. 28 is a block diagram illustrating an example computing device 2800 that may be used to implement various aspects of a BCT system, in accordance with various embodiments. The computing device 2800 may be a server, a client device, or any other suitable computing device capable of implementing the BCT system. The computing device 2800 may include one or more processors 2812 capable of processing instructions for execution within the computing device 2800. The processor(s) 2812 may include single-threaded or multi-threaded processors to enable parallel processing of instructions. The computing device 2800 may also include memory 2802 that stores information within the computing device 2800. The memory 2802 may include volatile and/or non-volatile memory and may store instructions to be executed by the processor(s) 2812. The memory 2802 may also store data structures, program modules, or other data. The computing device 2800 may include a storage system 2814, 2816 that provides additional storage capacity. The storage system may include removable storage 2814 and/or non-removable storage 2816. The storage system may include various computer-readable storage media such as magnetic disks, optical disks, solid state drives, or any other suitable storage media. The computing device 2800 may include input device(s) 2818 such as a keyboard, mouse, pen, voice input device, touch input device, or other suitable input devices. Output device(s) 2820 such as a display, speakers, printer, or other suitable output devices may also be included. The computing device 2800 may also include one or more communication connections 2822 that allow the device to communicate with other computing devices 2824. The communication connections 2822 may include various types of standard communication elements, such as one or more communications interfaces, network interfaces, network interface cards (NICs), radios, wireless transmitters/receivers (transceivers), wired and/or wireless communication media, physical connectors, and so forth.

As noted above, FIG. 28 illustrates a computing device 2800 configured to execute various applications and perform data processing tasks. The internal architecture 2801 of the computing device 2800 includes a system memory 2802, which comprises ROM/RAM and an operating system 2804. The operating system 2804 facilitates the management of hardware resources and provides foundational services for application execution. Within the system memory 2802, programming modules 2806 are stored, including an application 2808 configured to perform specific functions. The application 2808 interacts with program data 2810, which represents the data utilized and generated during execution. A processing unit 2812 is responsible for executing instructions and performing computational tasks. The computing device 2800 further includes removable storage 2814 and nonremovable storage 2816, which may consist of hard drives, flash drives, or other types of memory devices. These storage units facilitate data persistence and support the execution of applications. Input devices 2818, such as a keyboard, mouse, or touchscreen, allow users to interact with the computing device 2800. Output devices 2820, including monitors, printers, or speakers, present information to users. Communication connections 2822 enable data transmission between the computing device 2800 and other systems via wired or wireless networks. The computing device 2800 can interact with other computing devices 2824, establishing a networked environment to facilitate data sharing and collaborative processing. The components and modules within the computing device 2800 work in coordination to support diverse computing functions, including application execution, data processing, and external communication.

The components, modules, functions, and techniques discussed herein may be implemented in software, hardware, firmware, or a combination thereof. Various components, modules, or units have been described to emphasize functional aspects and do not necessarily require realization by different hardware units. The techniques described herein may be implemented in software executed by one or more processors, hardware, firmware, or any combination thereof. If implemented in software, the techniques may be realized at least in part by a computer-readable medium (e.g., memory 2802) comprising instructions that, when executed, performs one or more of the methods described above. The computer-readable medium may form part of a computer program product, which may include packaging materials.

The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer. The code or instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein.

Computing device 2800 may have additional features or functionality. For example, computing device 2800 may also include additional data storage devices (removable and/or non-removable) such as, for example, magnetic disks, optical disks, or tape. Such additional storage is illustrated in FIG. 28 by a removable storage 2814 and a non-removable storage 2816. Computer storage media may include volatile and nonvolatile, removable and non-removable media implemented in any method or technology for storage of information, such as computer readable instructions, data structures, program modules, or other data. System memory 2802, removable storage 2814, and non-removable storage 2816 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2800. Any such computer storage media may be part of device 2800. Computing device 2800 may also have input device(s) 2818 such as a keyboard, a mouse, a pen, a sound input device, a touch input device, etc. Output device(s) 2820 such as a display, speakers, a printer, etc. may also be included. The aforementioned devices are examples and others may be used.

Computing device 2800 may also contain a communication connections that may allow device 2800 to communicate with other computing devices 2824, such as over a network in a distributed computing environment, for example, an intranet or the Internet. Communication connection is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2802, including operating system 2804. While executing on processing unit 2812, programming modules 2806 (application 2808) may perform processes including, for example, one or more of method 100's stages as described above. The aforementioned process is an example, and processing unit 2812 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example No. 1

In an embodiment directed to "Translating Medical Imaging Data for Use in Augmented Reality Devices for Surgical Enhancement," the systems and methods facilitate a substantial advancement in surgical technology. By merging the detailed insight provided by medical imaging with the interactive capabilities of AR, this system introduces a transformative approach to surgical navigation and planning. Its broad applicability across multiple surgical specialties highlights its potential to revolutionize modern surgical practices, ultimately improving outcomes for patients on a global scale.

The systems and methods relate to the integration of medical imaging and AR technologies, aimed at enhancing surgical precision across multiple medical disciplines through advanced visualization techniques. Traditional surgical navigation and planning methods are constrained by their reliance on two-dimensional imaging, limited real-time spatial accuracy, and the necessity for invasive procedures to achieve visual guidance. These constraints contribute to surgical inefficiencies, increased risks of complications, and prolonged patient recovery times. There is a critical need for a technological advancement that bridges the gap between preoperative imaging and intraoperative guidance, providing real-time visualization to improve surgical outcomes.

This invention introduces a novel system that translates comprehensive medical imaging data into dynamic, interactive three-dimensional models within an AR environment. By integrating these models into AR devices, the system furnishes surgeons with an enhanced visual representation of patient anatomy, improving surgical planning, execution, and education. Some system features include a proprietary algorithm for real-time image data translation, an intuitive AR interface for surgical navigation, and compatibility with existing medical imaging formats. The system consists of an AR surgical interface, imaging translation module, and a structured operational workflow. The AR surgical interface includes custom-designed AR glasses equipped with high-resolution displays and sensors for accurate spatial tracking, allowing precise overlay of 3D anatomical models onto the surgeon's field of view. The imaging translation module comprises a software framework utilizing advanced algorithms to optimally translate and render medical imaging data into AR-compatible formats while maintaining anatomical accuracy and real-time performance. The operational workflow begins with preoperative planning, where surgeons upload patient-specific imaging data, which is processed to generate detailed 3D models of the surgical site. During intraoperative guidance, the AR interface overlays these models onto the real-world surgical field, dynamically adjusting to provide live, interactive guidance, assisting in precise surgical execution.

Innovative aspects of this system include dynamic data translation, which converts static medical imaging into interactive, anatomically precise 3D models for AR visualization; interactive surgical visualization, allowing surgeons to manipulate AR models in real-time to enhance spatial understanding and precision; and a feedback loop for surgical accuracy, which updates the AR visualization based on surgical progress, ensuring continuous alignment with preoperative plans. This invention is applicable across various surgical scenarios, including minimally invasive cardiac surgery, where AR visualizations facilitate valve replacements; neurosurgical intervention, enhancing tumor removal accuracy through precise neural pathway visualizations; orthopedic trauma surgery, assisting in the alignment and fixation of complex fractures; reconstructive plastic surgery, supporting facial reconstruction with layered AR anatomical models; and liver transplant surgery, guiding the resection and placement of liver transplants with detailed abdominal cavity models.

Example No. 2

In an embodiment systems and methods directed to "Precise Bone and Implant Rendering for Augmented Reality Surgical Assistance," pertain to the precise rendering and manipulation of bone structures and surgical implants using AR technologies, specifically designed to enhance the accuracy and effectiveness of surgical procedures involving orthopedic and reconstructive implants. Traditional surgical methods for implant placement and bone reconstruction often rely on two-dimensional imaging and manual measurements, which can lead to inaccuracies and complications. These limitations may result in suboptimal implant positioning, increased surgery time, and extended recovery periods for patients. There is a significant need for a technological solution that provides precise, real-time visual guidance for implant positioning and bone reconstruction, as well as the ability to manipulate these models interactively and view the sizing of the implants.

In an embodiment, the system renders and allows for the manipulation of bone structures and surgical implants within an augmented reality environment. By integrating these precise models into AR devices, the system offers surgeons enhanced visual insights for planning and executing surgical procedures. Key features include an advanced algorithm for real-time bone and implant rendering, an intuitive AR interface for surgical navigation, and compatibility with various medical imaging formats. Additionally, the system enables the movement of models via hand gestures or external tools and allows surgeons to view the sizing of implants.

The system comprises multiple components, including a custom-designed AR surgical interface in the form of high-resolution AR glasses with sensors for spatial tracking, facilitating the overlay of detailed bone and implant models onto the surgeon's field of view. A bone and implant rendering module employs advanced algorithms to convert medical imaging data into AR-compatible formats with high anatomical accuracy and real-time performance. An interactive manipulation interface enables surgeons to adjust 3D models through hand gestures or external tools, providing enhanced flexibility during surgery. An implant sizing viewer feature allows surgeons to examine and select different implant sizes, ensuring optimal fit and alignment during both surgical planning and execution.

The operational workflow begins with preoperative planning, where patient-specific imaging data is uploaded and processed to generate detailed 3D models of bone structures and surgical implants. During intraoperative guidance, the AR interface overlays these models onto the real-world surgical field, dynamically adjusting to provide live, interactive guidance for precise implant positioning and bone reconstruction. The system allows real-time manipulation of AR models using hand gestures or external tools, enhancing precision during surgery. Furthermore, the implant sizing feature enables surgeons to compare and select the most appropriate implant size for the patient.

Several components define the system, including precise bone rendering through algorithms that convert static medical imaging into interactive, anatomically accurate 3D models, accurate implant positioning via real-time model manipulation, interactive model control using gesture-based or external tool adjustments, and an implant sizing viewer that ensures proper selection and fit of implants. Additionally, a feedback mechanism updates the AR visualization based on surgical progress, ensuring continuous alignment with the preoperative plan.

The system has applications across multiple surgical fields, including orthopedic surgery, where it enhances the accuracy of implant placement in joint replacement procedures; spinal surgery, where it assists in precise positioning of spinal implants and hardware; maxillofacial surgery, where it supports detailed reconstruction of facial bone structures and implants; trauma surgery, where it facilitates accurate alignment and fixation of complex fractures; and dental implants, where it provides precise guidance for implant placement. "Precise Bone and Implant Rendering for Augmented Reality Surgical Assistance" represents an advancement in surgical technology. By merging detailed anatomical models with the interactive capabilities of augmented reality, enabling real-time model manipulation, and allowing surgeons to view implant sizing, this invention offers a novel approach to surgical navigation and planning. Its broad applicability across various surgical specialties underscores its potential to transform modern surgical practices, improving outcomes for patients worldwide.

Example No. 3

In an embodiment directed to a "System for Integrating Meaningful Biomechanical and Alignment Metrics in Augmented Reality Surgical Assistance," pertains to the integration of biomechanical and alignment metrics within AR technologies to enhance the accuracy and effectiveness of surgical procedures, particularly in orthopedic surgery. Traditional methods for assessing and correcting biomechanical alignment in orthopedic surgery rely heavily on two-dimensional imaging and manual measurements, which can lead to inaccuracies and suboptimal outcomes. These conventional approaches often fail to provide real-time, comprehensive visual feedback on critical biomechanical parameters such as femur valgus from the anatomical axis, tibia varus/valgus from the anatomical axis, flexion/extension, and tibial slope on the lateral view. As a result, there is a significant need for a technological solution that delivers precise, real-time visual guidance on these parameters during surgical procedures.

This embodiment introduces a system that integrates meaningful biomechanical and alignment metrics into an augmented reality environment for surgical assistance. By incorporating these metrics into AR devices, the system offers surgeons enhanced visual insights and real-time feedback for planning and executing surgical procedures. Some of the system features include advanced algorithms for real-time metric calculation, an intuitive AR interface for surgical navigation, and compatibility with various medical imaging formats. The system consists of multiple components that function in unison to provide an efficient and effective AR-based surgical guidance system. The AR surgical interface consists of custom-designed AR glasses equipped with high-resolution displays and sensors for accurate spatial tracking, facilitating the overlay of biomechanical and alignment metrics onto the surgeon's field of view.

A biomechanical metrics module employs a software framework utilizing advanced algorithms to calculate and display critical biomechanical and alignment metrics such as the Hip-Knee-Ankle Angle (HKAA), Lateral Distal Femoral Angle (LDFA), Medial Proximal Tibial Angle (MPTA), distance measurements between anatomical landmarks, Tibiofemoral Joint Line Angle (TJLA), Knee Ankle Angle (KAA), Joint Line Convergence Angle (JLCA), femur valgus from the anatomical axis, tibia varus/valgus from the anatomical axis, flexion/extension, and tibial slope on the lateral view. The interactive manipulation interface enables the manipulation of 3D models and metrics through hand gestures or external tools, enhancing the surgeon's ability to adjust and view different parameters in real time. Additionally, a metrics viewer allows surgeons to access detailed biomechanical and alignment metrics, ensuring optimal alignment and positioning during surgical planning and execution.

The system follows an operational workflow that includes preoperative planning, intraoperative guidance, model and metrics manipulation, and metrics viewing. During preoperative planning, surgeons upload patient-specific imaging data, which is processed by the system to generate detailed 3D models and calculate biomechanical and alignment metrics. Intraoperative guidance is provided through the AR interface, which overlays these metrics onto the real-world surgical field, adjusting in real time to offer live, interactive guidance for precise alignment and positioning. The system further allows surgeons to manipulate the AR models and metrics using hand gestures or external tools, permitting real-time adjustments and precise control during surgery. The metrics viewer provides detailed views of biomechanical and alignment metrics, assisting surgeons in making informed decisions on alignment and positioning.

In an embodiment of the system includes real-time biomechanical metrics calculated by algorithms designed to display critical biomechanical and alignment parameters such as femur valgus, tibia varus/valgus, flexion/extension, and tibial slope. The system offers accurate surgical guidance by allowing surgeons to manipulate AR models and metrics in real time, ensuring optimal alignment and positioning. The interactive model and metrics manipulation feature provide the ability to move and adjust models and metrics using hand gestures or external tools, offering enhanced control and flexibility during surgical procedures. A comprehensive metrics viewer is integrated into the system, allowing surgeons to access detailed biomechanical and alignment metrics, ensuring the best possible surgical outcomes. Additionally, a feedback loop mechanism updates the AR visualization and metrics based on surgical progress, ensuring continuous alignment with the preoperative plan.

The system has broad applicability across multiple surgical fields. In orthopedic surgery, it enhances the accuracy of implant placement and bone alignment in joint replacement and reconstructive surgeries. In spinal surgery, it assists in the precise positioning of spinal implants and hardware with detailed biomechanical metrics. For maxillofacial surgery, the system supports detailed reconstruction of facial bone structures with alignment metrics. Trauma surgery benefits from the system's ability to facilitate the alignment and fixation of complex fractures with real-time biomechanical feedback. In sports medicine, the system provides precise guidance for corrective procedures on sports-related injuries with biomechanical metrics. The "System for Integrating Meaningful Biomechanical and Alignment Metrics in Augmented Reality Surgical Assistance" represents an advancement in surgical technology. By merging detailed anatomical models and biomechanical metrics with the interactive capabilities of augmented reality, this invention offers a novel approach to surgical navigation and planning. Its broad applicability across various surgical specialties underscores its potential to transform modern surgical practices, improving outcomes for patients worldwide.

EXAMPLES

In some aspects, the techniques described herein relate to a system for augmented reality surgical assistance, including: an augmented reality surgical interface configured to be worn by a user; a bone and implant rendering module configured to generate three-dimensional models based on patient imaging data; a biomechanical metrics module configured to calculate biomechanical and alignment metrics; and a processor configured to integrate the three-dimensional models and biomechanical metrics for display via the augmented reality surgical interface.

In some aspects, the techniques described herein relate to a system, further including an interactive manipulation interface configured to enable manipulation of the three-dimensional models and biomechanical metrics through user input.

In some aspects, the techniques described herein relate to a system, wherein the user input includes at least one of hand gestures or external tool movements.

In some aspects, the techniques described herein relate to a system, wherein the augmented reality surgical interface includes: high-resolution displays; spatial tracking sensors; a processor for real-time rendering; and wireless communication capabilities.

In some aspects, the techniques described herein relate to a system, wherein the biomechanical metrics include at least one of: Hip-Knee-Ankle Angle (HKAA); Lateral Distal Femoral Angle (LDFA); Medial Proximal Tibial Angle (MPTA); Tibiofemoral Joint Line Angle (TJLA); Knee Ankle Angle (KAA); Joint Line Convergence Angle (JLCA); femur valgus from anatomical axis; tibia varus/valgus from anatomical axis; flexion/extension; or tibial slope on a lateral view.

In some aspects, the techniques described herein relate to a system, further including a metrics viewer configured to provide detailed views of the biomechanical and alignment metrics.

In some aspects, the techniques described herein relate to a system, wherein the processor is further configured to update the integrated three-dimensional models and biomechanical metrics based on surgical progress.

In some aspects, the techniques described herein relate to a method for providing augmented reality surgical assistance, including: receiving patient imaging data; generating three-dimensional models of bone structures and implants based on the patient imaging data; calculating biomechanical and alignment metrics based on the patient imaging data and three-dimensional models; integrating the three-dimensional models and biomechanical metrics; and displaying the integrated models and metrics via an augmented reality surgical interface.

In some aspects, the techniques described herein relate to a method, further including: receiving user input for manipulating the displayed models and metrics; and updating the display based on the user input.

In some aspects, the techniques described herein relate to a method, wherein the user input includes at least one of hand gestures or external tool movements.

In some aspects, the techniques described herein relate to a method, further including updating the displayed models and metrics based on surgical progress.

In some aspects, the techniques described herein relate to a method, wherein the biomechanical metrics include at least one of: Hip-Knee-Ankle Angle (HKAA); Lateral Distal Femoral Angle (LDFA); Medial Proximal Tibial Angle (MPTA); Tibiofemoral Joint Line Angle (TJLA); Knee Ankle Angle (KAA); Joint Line Convergence Angle (JLCA); femur valgus from anatomical axis; tibia varus/valgus from anatomical axis; flexion/extension; or tibial slope on a lateral view.

In some aspects, the techniques described herein relate to a method, further including providing detailed views of the biomechanical and alignment metrics via a metrics viewer.

In some aspects, the techniques described herein relate to a method, further including storing final model and metric states for post-operative analysis.

In some aspects, the techniques described herein relate to a non-transitory computer-readable medium storing instructions that, when executed by a processor, cause the processor to perform operations including: receiving patient imaging data; generating three-dimensional models of bone structures and implants based on the patient imaging data; calculating biomechanical and alignment metrics based on the patient imaging data and three-dimensional models; integrating the three-dimensional models and biomechanical metrics; and transmitting the integrated models and metrics for display via an augmented reality surgical interface.

In some aspects, the techniques described herein relate to a non-transitory computer-readable medium, wherein the operations further include: receiving user input for manipulating the models and metrics; and updating the integrated models and metrics based on the user input.

In some aspects, the techniques described herein relate to a non-transitory computer-readable medium, wherein the user input includes at least one of hand gestures or external tool movements.

In some aspects, the techniques described herein relate to a non-transitory computer-readable medium, wherein the operations further include updating the integrated models and metrics based on surgical progress.

In some aspects, the techniques described herein relate to a non-transitory computer-readable medium, wherein the biomechanical metrics include at least one of: Hip-Knee-Ankle Angle (HKAA); Lateral Distal Femoral Angle (LDFA); Medial Proximal Tibial Angle (MPTA); Tibiofemoral Joint Line Angle (TJLA); Knee Ankle Angle (KAA); Joint Line Convergence Angle (JLCA); femur valgus from anatomical axis; tibia varus/valgus from anatomical axis; flexion/extension; or tibial slope on a lateral view.

In some aspects, the techniques described herein relate to a non-transitory computer-readable medium, wherein the operations further include storing final model and metric states for post-operative analysis.

Furthermore, the systems and methods described herein may have broad applicability across various surgical specialties. While particularly well-suited for orthopedic procedures, the technology may also be adapted for use in neurosurgery, cardiovascular surgery, and other medical fields requiring precise anatomical visualization and alignment. The integration of advanced imaging translation algorithms with augmented reality technology may bridge the gap between preoperative planning and intraoperative execution. This seamless integration may enhance surgical workflow efficiency and potentially reduce the cognitive load on surgeons during complex procedures.

It will be apparent to those skilled in the art that various modifications and variations can be made to the disclosed systems and methods without departing from the scope of the disclosure. Other embodiments of the disclosure will be apparent to those skilled in the art from consideration of the specification and practice of the disclosure disclosed herein. It is intended that the specification and examples be considered as exemplary only, with a true scope of the disclosure being indicated by the following claims and their equivalents.

What is claimed is:

1. A system for augmented reality surgical assistance, comprising:
   an augmented reality surgical interface configured to be worn by a user;
     wherein the augmented reality surgical interface comprises:
       high-resolution displays;
       spatial tracking sensors;
       a processor for real-time rendering;
       wireless communication capabilities;
   a bone and implant rendering module configured to generate three-dimensional models based on patient imaging data;
   a biomechanical metrics module configured to calculate biomechanical and alignment metrics;
   a processor configured to integrate the three-dimensional models and biomechanical metrics for display via the augmented reality surgical interface;
   an interactive manipulation interface configured to enable manipulation of the three-dimensional models and biomechanical metrics through user input;
   wherein the user input comprises at least one of hand gestures or external tool movements;
   wherein the biomechanical metrics consists of:
     Hip-Knee-Ankle Angle (HKAA);
     Lateral Distal Femoral Angle (LDFA);
     Medial Proximal Tibial Angle (MPTA);
     Tibiofemoral Joint Line Angle (TJLA);
     Knee Ankle Angle (KAA);
     Joint Line Convergence Angle (JLCA);
     femur valgus from anatomical axis;
     tibia *varus*/valgus from anatomical axis;
     flexion/extension; and
     tibial slope on a lateral view.

2. The system of claim 1, further comprising a metrics viewer configured to provide detailed views of the biomechanical and alignment metrics.

3. The system of claim 1, wherein the processor is further configured to update the integrated three-dimensional models and biomechanical metrics based on surgical progress.

4. The system for augmented reality surgical assistance of claim 1, further comprising:
   an augmented reality head-mounted display configured to be worn by a surgeon;
   wherein the augmented reality head-mounted display comprises:
     stereoscopic high-resolution displays configured for precise depth perception;

inertial measurement units configured for six-degree-of-freedom tracking;
infrared cameras configured for hand tracking; and
wireless transceivers configured for real-time data transmission;
a three-dimensional rendering engine configured to generate patient-specific anatomical models from medical imaging data;
a biomechanical analysis engine configured to calculate surgical alignment parameters;
a sensor fusion processor configured to integrate multiple sensor inputs for enhanced tracking accuracy;
depth sensing cameras configured to monitor surgical site topology changes;
wherein the system is configured to overlay dynamic surgical guidance information onto the surgeon's field of view with sub-millimeter registration accuracy.

5. The system of claim 4, wherein the sensor fusion processor is configured to combine inertial measurement unit data with optical tracking data to maintain tracking accuracy during rapid head movements.

6. A method for providing augmented reality surgical assistance, comprising:
receiving, by a system having a processor, patient imaging data;
generating, by a system having a processor, three-dimensional models of bone structures and implants based on the patient imaging data;
calculating, by a system having a processor, biomechanical and alignment metrics based on the patient imaging data and three-dimensional models;
integrating, by a system having a processor, the three-dimensional models and biomechanical metrics;
displaying, by a system having a processor, the integrated models and metrics via an augmented reality surgical interface;
detecting, by a system having a processor, intraoperative tissue deformation using depth sensors;
dynamically adjusting overlay of the three-dimensional models in response to the detected intraoperative tissue deformation;
performing, by a system having a processor, real-time calibration of the overlay to anatomical landmarks;
reducing latency between user input and display updates through hardware acceleration;
receiving, by a system having a processor, user input for manipulating the displayed models and metrics;
updating, by a system having a processor, the display based on the user input;
wherein the user input comprises at least one of hand gestures or external tool movements; and
wherein the biomechanical metrics comprises at least four of:
Hip-Knee-Ankle Angle (HKAA);
Lateral Distal Femoral Angle (LDFA);
Medial Proximal Tibial Angle (MPTA);
Tibiofemoral Joint Line Angle (TJLA);
Knee Ankle Angle (KAA);
Joint Line Convergence Angle (JLCA);
femur valgus from anatomical axis;
tibia *varus*/valgus from anatomical axis;
flexion/extension; and
tibial slope on a lateral view.

7. The method of claim 6, wherein the real-time calibration comprises maintaining alignment accuracy within sub-millimeter tolerances.

8. The method of claim 6, further comprising fusing imaging data with patient physiological data to enhance surgical guidance accuracy.

9. The method of claim 6, further comprising detecting hand gestures comprising close grab functions and distance grab functions for model manipulation.

10. The method of claim 6, further comprising providing error-correction algorithms that compensate for patient movement during surgery.

11. The method of claim 6, wherein the hardware acceleration comprises dedicated graphics processing units configured for real-time three-dimensional rendering.

12. A non-transitory computer-readable medium storing instructions that, when executed by a processor, cause the processor to perform operations comprising:
receiving patient imaging data;
generating three-dimensional models of bone structures and implants based on the patient imaging data;
calculating biomechanical and alignment metrics based on the patient imaging data and three-dimensional models;
integrating the three-dimensional models and biomechanical metrics;
transmitting the integrated models and metrics for display via an augmented reality surgical interface;
processing depth sensor data to detect intraoperative tissue deformation;
dynamically adjusting the integrated models in response to the detected tissue deformation;
performing sensor fusion of imaging data with patient physiological data;
executing latency reduction algorithms to minimize display update delays;
wherein the operations further comprise:
receiving user input for manipulating the models and metrics;
updating the integrated models and metrics based on the user input; and
wherein the user input comprises at least one of hand gestures or external tool movements.

13. The non-transitory computer-readable medium of claim 12, wherein the operations further comprise executing real-time calibration algorithms to maintain alignment of three-dimensional models with anatomical landmarks.

14. The non-transitory computer-readable medium of claim 12, wherein the operations further comprise processing hand gesture recognition data to enable manipulation of the three-dimensional models through close grab and distance grab functions.

15. The non-transitory computer-readable medium of claim 12, wherein the operations further comprise executing error-correction algorithms that compensate for patient movement during surgical procedures.

16. The non-transitory computer-readable medium of claim 12, wherein the sensor fusion comprises correlating real-time patient vital signs with anatomical model positioning.

17. The non-transitory computer-readable medium of claim 12, wherein the latency reduction algorithms comprise predictive rendering techniques that anticipate user interactions.

* * * * *